US009710529B2

(12) United States Patent
Singh et al.

(10) Patent No.: US 9,710,529 B2
(45) Date of Patent: Jul. 18, 2017

(54) DATA CONSTRUCTION FOR EXTRACT, TRANSFORM AND LOAD OPERATIONS FOR A DATABASE

(71) Applicant: Accenture Global Services Limited, Dublin (IE)

(72) Inventors: Siddharth Saran Singh, Bangalore (IN); Acyr da Luz, Chadds Ford, PA (US); Steen B. Moller, Edina, MN (US); Eishvinder Ratra, Eden Prairie, MN (US); Nilesh Shirke, Woodbury, MN (US); Srinivasa Rao Varanasi, Bangalore (IN); Ilan Geller, St Paul, MN (US); Thomas Woodward, Minneapolis, MN (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 361 days.

(21) Appl. No.: 14/507,614

(22) Filed: Oct. 6, 2014

(65) Prior Publication Data

US 2015/0347540 A1 Dec. 3, 2015

(30) Foreign Application Priority Data

Jun. 2, 2014 (IN) .......................... 2683/CHE/2014

(51) Int. Cl.
*G06F 7/00* (2006.01)
*G06F 17/00* (2006.01)
*G06F 17/30* (2006.01)

(52) U.S. Cl.
CPC .. *G06F 17/30563* (2013.01); *G06F 17/30371* (2013.01)

(58) Field of Classification Search
CPC ......... G06F 17/30563; G06F 17/30592; G06F 17/30371; G06F 17/30864; G06F 17/30292
USPC ....................................................... 707/602
See application file for complete search history.

(56) References Cited

U.S. PATENT DOCUMENTS

| 8,131,686 | B2 | 3/2012 | Lakshmanachar et al. |
| 8,296,615 | B2 | 10/2012 | Rajamony et al. |
| 2005/0021541 | A1* | 1/2005 | Rangadass ............. G06Q 10/06 |
| 2007/0179939 | A1* | 8/2007 | O'Neil ................. G06F 17/3056 |
| 2008/0168082 | A1* | 7/2008 | Jin ............................ G06F 8/20 |
| 2009/0077114 | A1* | 3/2009 | Zachariah ............. G06F 17/303 |

(Continued)

OTHER PUBLICATIONS

Department of Education Office of Federal Student Aid, Data Migration Roadmap: A Best Practice Summary, Apr. 2007, Version 1.0.

(Continued)

*Primary Examiner* — Hosain Alam
*Assistant Examiner* — Nicholas Allen
(74) *Attorney, Agent, or Firm* — Mannava & Kang, P.C.

(57) ABSTRACT

An extract, transform and load (ETL) data construction system provides an extensible, interim platform for transitioning data from a legacy database or other data sources to a target database. The data construction system performs data construction operations which may include creating data that can be used for data transformation in ETL operations. The data construction system provides check-in-check-out procedures for controlling multi-user data access and data editing, and also provides multi-level user access checks.

20 Claims, 22 Drawing Sheets

(56) References Cited

U.S. PATENT DOCUMENTS

| | | | |
|---|---|---|---|
| 2009/0119476 A1 | 5/2009 | Jernigan et al. | |
| 2011/0295795 A1* | 12/2011 | Venkatasubramanian | G06F 17/30563 707/602 |
| 2012/0150791 A1* | 6/2012 | Willson | G06F 17/30563 707/600 |
| 2013/0325788 A1* | 12/2013 | Brown | G06F 17/30563 707/602 |
| 2013/0339943 A1 | 12/2013 | Mallya | |

OTHER PUBLICATIONS

Premier International, Extract, Quickly and easily extract data from disparate source systems, date downloaded Oct. 6, 2014. http://premier-international.com/Solutions_Extract.aspx.

Ranga Rao Davala et al., A Case Study on Data Migration Strategy and Template Design for Mergers and Acquisitions in the Oil and Gas Sector, The Data Administration Newsletter, Mar. 1, 2011. http://www.tdan.com/view-articles/14999.

POD, Inc., Introducing STATTM, POD Inc.'s Data Cleansing and Migration Toolset, POD, Inc., 2012.

Winshuttle, SAP and Excel—Maximize productivity with a familiar tool, date downloaded Oct. 6, 2014. http://www.winshuttle.com/solutions-sap/by-function-task/sap-excel/.

Innowera, Innowera Technology Overview, date downloaded Oct. 6, 2014. http://innowera.com/sap-data-technology-overview.php.

Rahm et al., Data Cleaning: Problems and Current Approaches, University of Leipzig, Germany, date downloaded Oct. 6, 2014.

Packt Publishing, Data Migration Scenarios in SAP Business One Application—Part 1, date downloaded Oct. 6, 2014. https://www.packtpub.com/books/content/data-migration-scenarios-sap-business-one-application-part-1.

MapForce, MapForce Graphical Data Mapping, Conversion & Integration Platform, date downloaded Oct. 6, 2014.

* cited by examiner

| Target System | | | Source System | | | |
|---|---|---|---|---|---|---|
| Target Table | Description | Field Description | Source Table | Source Field | Rule Type | Detailed Rule Instruction | Default Value |
| Target Table name | Target Table description | Target Table Field description | Source Table name | Source Table Field name | Default - Mapping a constant value  Copy - Mapping legacy value directly to SAP 'as is' | Business rules that define mapping and/or transformation details | SAP default value for 'Default' rules |
| | | | | | | | |
| | | | | | | | |
| | | | | | | | |
| | | | | | | | |

. . . FIG. 5

| Requirements | | | | | | | | | |
|---|---|---|---|---|---|---|---|---|---|
| Field Type | Field Name | Key Relationship | Required | Source System | Source Table | Source Field | Source Notes | Initial Field Value | Acceptable Values (Dropdown List) | Restriction (XLS Validations) | DS Validation |
| | | | | | | | | | | | |
| | | | | | | | | | | | |
| | | | | | | | | | | | |

. . . FIG. 6

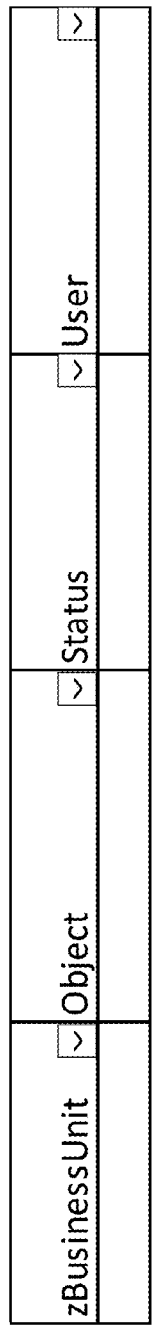
FIG. 8A
FIG. 8B

View/Edit

| Action | UNIQUE_ID | LEGACY_VALUE | SAP_VALUE |
|---|---|---|---|
| View | 1 | USA | US |
| View | 2 | INDIA | IN |
| View | | USA | SL |
| View | | | |
| Edit | | | |

FIG. 10

View/Add

| Action | Customer_Number | Customer_Account_Group | Language |
|---|---|---|---|
| View | SH10003 | Z002 | E |
| View | SP10001 | Z001 | E |
| View | SP10002 | Z001 | E |
| View | SP10003 | Z001 | E |
| View | BP10001 | Z001 | E |
| View | BP10002 | Z001 | E |
| View | BP10003 | Z001 | E |
| View | PY10001 | Z004 | E |
| View | PY10002 | Z004 | E |
| Add | | | |

FIG. 11

| | A | B | C | D | E | F | G |
|---|---|---|---|---|---|---|---|
| 1 | Action | UNIQUE_ID | MATERIAL_NUMBER | MATERIAL_TYPE | MATERIAL_DESCRIPTION | UNIT_OF_MEASURE | DIVISIO |
| 2 | View | 10000 | 10543 | FERT | SHAMPOO SUPER WASH-WOMEN-12FLOZ-20UN | CA | 10 |
| 3 | View | 10001 | 10544 | FERT | SHAMPOO SUPER WASH-MEN-12FLOZ-20UN | CA | 10 |
| 4 | View | 10002 | 40545 | FERT | SHAMPOO SUPER WASH-WOMEN-6FLOZ-20UN | CA | 10 |
| 5 | View | 10003 | 10633 | FERT | SHAMPOO SUPER WASH-MEN-6FLOZ-20UN | CA | 10 |
| 6 | View | 10004 | 10546 | FERT | SHAMPOO SUPER CLEAN-WOMEN-12FLOZ-20UN | | 10 |
| 7 | View | 10005 | 10547 | FERT | SHAMPOO SUPER CLEAN-MEN-12FLOZ-20UN | | 10 |
| 8 | View | 10006 | 10548 | FERT | SHAMPOO SUPER NEAT-WOMEN-12FLOZ-20UN | | 10 |
| 9 | View | 10007 | 10549 | FERT | SHAMPOO SUPER NEAT-MEN-12FLOZ-20UN | | 10 |
| 10 | View | 10008 | 10550 | FERT | SHAMPOO SUPER NEAT-WOMEN-6FLOZ-20UN | | 10 |
| 11 | View | 10009 | 10551 | FERT | SHAMPOO SUPER NEAT-MEN-6FLOZ-20UN | | 10 |
| 12 | View | 10010 | 10552 | FERT | SHAMPOO SUPER NEAT-MEN-6FLOZ-20UN | CA | 10 |
| 13 | View | 10011 | 10553 | FERT | HAIR CONDITIONER SUPER WASH-WOMEN-12FLOZ-20UN | CA | 20 |
| 14 | View | 10012 | 10554 | FERT | HAIR CONDITIONER SUPER WASH-MEN-12FLOZ-20UN | CA | 20 |
| 15 | View | 10013 | 10555 | FERT | HAIR CONDITIONER SUPER CLEAN-WOMEN-12FLOZ-20UN | CA | 20 |
| 16 | View | 10014 | 10987 | FERT | HAIR CONDITIONER SUPER CLEAN-WOMEN-12FLOZ-20UN | CA | 20 |
| 17 | View | 10015 | 10556 | FERT | HAIR CONDITIONER SUPER CLEAN-MEN-12FLOZ-20UN | CA | 20 |
| 18 | View | 10016 | 10557 | FERT | HAIR CONDITIONER SUPER NEAT-WOMEN-12FLOZ-20UN | CA | 20 |
| 19 | View | 10017 | 10558 | FERT | HAIR CONDITIONER SUPER NEAT-MEN-12FLOZ-20UN | CA | 20 |
| 20 | View | 10018 | 10559 | FERT | HAIR MOISTURIZER SUPER WASH-WOMEN-4FLOZ-60UN | CA | 30 |
| 21 | View | 10019 | 10560 | FERT | HAIR MOISTURIZER SUPER WASH-MEN-4FLOZ-60UN | | 30 |
| 22 | View | 10020 | 10561 | FERT | HAIR MOISTURIZER SUPER CLEAN-WOMEN-4FLOZ-60UN | CA | 30 |
| 23 | View | 10021 | 10562 | FERT | HAIR MOISTURIZER SUPER CLEAN-MEN-4FLOZ-60UN | CA | 30 |
| 24 | View | 10022 | 10563 | FERT | HAIR MOISTURIZER SUPER NEAT-WOMEN-4FLOZ-60UN | CA | 30 |
| 25 | View | 10023 | 10564 | FERT | HAIR MOISTURIZER SUPER NEAT-MEN-4FLOZ-60UN | CA | 30 |

FIG. 18

| | A | G | H | I | J | K | L | M | N | |
|---|---|---|---|---|---|---|---|---|---|---|
| 1 | Action | DIVISION | MATERIAL_GROUP | GROSS_WEIGHT | WEIGHT_UNIT | NET_WEIGHT | VOLUME | VOLUME_UNIT | EAN_UPC | EAN_C/ |
| 2 | View | 10 | 1040 | 10 | KG | 8.5 | 7.1 | L | 7941131743801 | VI |
| 3 | View | 10 | 1040 | 10 | KG | 8.5 | 7.1 | L | 7941131743901 | VI |
| 4 | View | 10 | 1040 | 10 | KG | 8.5 | 3.5 | L | 7941131744201 | VI |
| 5 | View | 10 | 1040 | 10 | KG | 8.5 | 3.5 | L | 7941131744201 | VI |
| 6 | View | 10 | 1040 | 10 | KG | 8.5 | | | 7941131637401 | VI |
| 7 | View | 10 | 1040 | 10 | KG | 8.5 | | | 7941131048701 | VI |
| 8 | View | 10 | 1040 | 10 | KG | 8.5 | | | 7941131743801 | VI |
| 9 | View | 10 | 1040 | 10 | KG | 8.5 | 7.1 | L | 7941131191901 | VI |
| 10 | View | 10 | 1040 | 10 | KG | 8.5 | 7.1 | L | 7941131876201 | VI |
| 11 | View | 10 | 1040 | 10 | KG | 8.5 | 3.5 | L | 7941131934101 | VI |
| 12 | View | 10 | 1040 | 10 | KG | 8.5 | 7.8 | L | 7941131666401 | VI |
| 13 | View | 20 | 1050 | 10 | KG | 8.5 | 7.8 | L | 7941131908001 | VI |
| 14 | View | 20 | 1050 | 10 | KG | 8.5 | 7.8 | L | 7941131123401 | VI |
| 15 | View | 20 | 1050 | 10 | KG | | 7.8 | | 7941131764801 | VI |
| 16 | View | 20 | 1050 | 10 | KG | | 7.8 | | 7941131988801 | VI |
| 17 | View | 20 | 1050 | 10 | KG | | 7.8 | | 7941131988801 | VI |
| 18 | View | 20 | 1050 | 10 | KG | 8.5 | 7.8 | L | 7941131477401 | VI |
| 19 | View | 20 | 1050 | 10 | KG | 8.5 | 7.8 | L | 7941131873301 | VI |
| 20 | View | 30 | 1090 | 10 | KG | 8.5 | 7.8 | L | 7941131096801 | VI |
| 21 | View | 30 | 1090 | 10 | KG | 8.5 | 7.8 | L | 7941131224301 | VI |
| 22 | View | 30 | 1090 | 10 | KG | 8.5 | 7.8 | L | 7941131450901 | VI |
| 23 | View | 30 | 1090 | 10 | KG | 8.5 | 7.8 | L | 7941131098701 | VI |
| 24 | View | 30 | 1090 | 10 | KG | 8.5 | 7.8 | L | 7941131768501 | VI |

FIG. 19

| | A | P | Q | R | S | T | U |
|---|---|---|---|---|---|---|---|
| 1 | Action | ERROR_COLUMNS | CHECKED_OUT | CHECKED_OUT_BY | CHECKED_OUT_BY | GO_LIVE | MODIFIED_O |
| 2 | View | | X | sabrina.yamashita | 5/6/2014 11:46:59 PM | | |
| 3 | View | | X | sabrina.yamashita | 5/6/2014 11:46:59 PM | | |
| 4 | View | | X | sabrina.yamashita | 5/6/2014 11:46:59 PM | | |
| 5 | View | | X | sabrina.yamashita | 5/6/2014 11:46:59 PM | | |
| 6 | View | UNIT_OF_MEASURE VOLUME VOLUME_UNIT | X | sabrina.yamashita | 5/6/2014 11:46:59 PM | | |
| 7 | View | UNIT_OF_MEASURE VOLUME VOLUME_UNIT | X | sabrina.yamashita | 5/6/2014 11:46:59 PM | | |
| 8 | View | UNIT_OF_MEASURE VOLUME VOLUME_UNIT | X | sabrina.yamashita | 5/6/2014 11:46:59 PM | | |
| 9 | View | UNIT_OF_MEASURE | X | sabrina.yamashita | 5/6/2014 11:46:59 PM | | |
| 10 | View | UNIT_OF_MEASURE | X | sabrina.yamashita | 5/6/2014 11:46:59 PM | | |
| 11 | View | UNIT_OF_MEASURE | X | sabrina.yamashita | 5/6/2014 11:46:59 PM | | |
| 12 | View | | X | sabrina.yamashita | 5/6/2014 11:46:59 PM | | |
| 13 | View | | X | sabrina.yamashita | 5/6/2014 11:46:59 PM | | |
| 14 | View | | X | sabrina.yamashita | 5/6/2014 11:46:59 PM | | |
| 15 | View | GROSS_WEIGHT WEIGHT_UNIT NET_WEIGHT | X | sabrina.yamashita | 5/6/2014 11:46:59 PM | | |
| 16 | View | GROSS_WEIGHT WEIGHT_UNIT NET_WEIGHT | X | sabrina.yamashita | 5/6/2014 11:46:59 PM | | |
| 17 | View | GROSS_WEIGHT WEIGHT_UNIT NET_WEIGHT | X | sabrina.yamashita | 5/6/2014 11:46:59 PM | | |
| 18 | View | | | sabrina.yamashita | 5/6/2014 11:46:59 PM | | |
| 19 | View | | | sabrina.yamashita | 5/6/2014 11:46:59 PM | | |
| 20 | View | UNIT_OF_MEASURE | X | sabrina.yamashita | 5/6/2014 11:46:59 PM | | |
| 21 | View | | X | sabrina.yamashita | 5/6/2014 11:46:59 PM | | |
| 22 | View | | X | sabrina.yamashita | 5/6/2014 11:46:59 PM | | |
| 23 | View | | X | sabrina.yamashita | 5/6/2014 11:46:59 PM | | |
| 24 | View | | X | sabrina.yamashita | 5/6/2014 11:46:59 PM | | |
| 25 | View | | X | sabrina.yamashita | 5/6/2014 11:46:59 PM | | |

FIG. 20

| | A | B | C | D | E | F | G |
|---|---|---|---|---|---|---|---|
| 1 | Action | UNIQUE_ID | MATERIAL_NUMBER | MATERIAL_TYPE | MATERIAL_DESCRIPTION | UNIT_OF_MEASURE | DIVISION |
| 2 | View | 10000 | 10543 | FERT | SHAMPOO SUPER WASH-WOMEN-12FL.OZ-20UN | CA | 10 |
| 3 | View | 10001 | 10544 | FERT | SHAMPOO SUPER WASH-MEN-12FL.OZ-20UN | CA | 10 |
| 4 | View | 10002 | 40545 | FERT | SHAMPOO SUPER WASH-WOMEN-6FL.OZ-20UN | CA | 10 |
| 5 | View | 10003 | 10633 | FERT | SHAMPOO SUPER WASH-WOMEN-6FL.OZ-20UN | CA | 10 |
| 6 | View | 10004 | 10546 | FERT | SHAMPOO SUPER WASH-MEN-6FL.OZ-20UN | CA | 10 |
| 7 | View | 10005 | 10547 | FERT | SHAMPOO SUPER CLEAN-WOMEN-12FL.OZ-20UN | CA | 10 |
| 8 | View | 10006 | 10548 | FERT | SHAMPOO SUPER CLEAN-MEN-12FL.OZ-20UN | CA | 10 |
| 9 | View | 10007 | 10549 | FERT | SHAMPOO SUPER NEAT-WOMEN-12FL.OZ-20UN | CA | 10 |
| 10 | View | 10008 | 10550 | FERT | SHAMPOO SUPER NEAT-MEN-12FL.OZ-20UN | CA | 10 |
| 11 | View | 10009 | 10551 | FERT | SHAMPOO SUPER NEAT-WOMEN-6FL.OZ-20UN | CA | 10 |
| 12 | View | 10010 | 10552 | FERT | SHAMPOO SUPER NEAT-MEN-6FL.OZ-20UN | CA | 10 |
| 13 | View | 10011 | 10553 | FERT | HAIR CONDITIONER SUPER WASH-WOMEN-12FLOZ-20UN | CA | 20 |
| 14 | View | 10012 | 10554 | FERT | HAIR CONDITIONER SUPER WASH-MEN-12FLOZ-20UN | CA | 20 |
| 15 | View | 10013 | 10555 | FERT | HAIR CONDITIONER SUPER CLEAN-WOMEN-12FLOZ-20UN | CA | 20 |
| 16 | View | 10014 | 10987 | FERT | HAIR CONDITIONER SUPER CLEAN-MEN-12FLOZ-20UN | CA | 20 |
| 17 | Delete | 10015 | 10556 | FERT | HAIR CONDITIONER SUPER NEAT-WOMEN-12FLOZ-20UN | CA | 20 |
| 18 | View | 10016 | 10557 | FERT | HAIR CONDITIONER SUPER NEAT-MEN-12FLOZ-20UN | CA | 20 |
| 19 | View | 10017 | 10558 | FERT | HAIR MOISTURIZER SUPER WASH-WOMEN-4FLOZ-60UN | CA | 30 |
| 20 | View | 10018 | 10559 | FERT | HAIR MOISTURIZER SUPER WASH-MEN-4FLOZ-60UN | CA | 30 |
| 21 | View | 10019 | 10560 | FERT | HAIR MOISTURIZER SUPER CLEAN-WOMEN-4FLOZ-60UN | CA | 30 |
| 22 | View | 10020 | 10561 | FERT | HAIR MOISTURIZER SUPER CLEAN-MEN-4FLOZ-60UN | CA | 30 |
| 23 | View | 10021 | 10562 | FERT | HAIR MOISTURIZER SUPER NEAT-WOMEN-4FLOZ-60UN | CA | 30 |
| 24 | View | 10022 | 10563 | FERT | HAIR MOISTURIZER SUPER NEAT-MEN-4FLOZ-60UN | CA | 30 |
| 25 | View | 10023 | 10564 | FERT | HAIR MOISTURIZER SUPER NEAT-MEN-4FLOZ-60UN | CA | 30 |

FIG. 21

| | A | B | C | D | E | F | G |
|---|---|---|---|---|---|---|---|
| 1 | Action | UNIQUE_ID | MATERIAL_NUMBER | MATERIAL_TYPE | MATERIAL_DESCRIPTION | UNIT_OF_MEASURE | DIVISIO |
| 2 | View | 10000 | 10543 | FERT | SHAMPOO SUPER WASH-WOMEN-12FLOZ-20UN | CA | 10 |
| 3 | View | 10001 | 10544 | FERT | SHAMPOO SUPER WASH-MEN-12FLOZ-20UN | CA | 10 |
| 4 | View | 10002 | 40545 | FERT | SHAMPOO SUPER WASH-WOMEN-6FLOZ-20UN | CA | 10 |
| 5 | View | 10003 | 10633 | FERT | SHAMPOO SUPER WASH-MEN-6FLOZ-20UN | CA | 10 |
| 6 | View | 10004 | 10546 | FERT | SHAMPOO SUPER WASH-MEN-6FLOZ-20UN | | 10 |
| 7 | View | 10005 | 10547 | FERT | SHAMPOO SUPER CLEAN-WOMEN-12FLOZ-20UN | | 10 |
| 8 | View | 10006 | 10548 | FERT | SHAMPOO SUPER CLEAN-MEN-12FLOZ-20UN | | 10 |
| 9 | View | 10007 | 10549 | FERT | SHAMPOO SUPER NEAT-WOMEN-12FLOZ-20UN | | 10 |
| 10 | View | 10008 | 10550 | FERT | SHAMPOO SUPER NEAT-MEN-12FLOZ-20UN | | 10 |
| 11 | View | 10009 | 10551 | FERT | SHAMPOO SUPER NEAT-WOMEN-6FLOZ-20UN | | 10 |
| 12 | View | 10010 | 10552 | FERT | SHAMPOO SUPER NEAT-MEN-6FLOZ-20UN | CA | 10 |
| 13 | View | 10011 | 10553 | FERT | HAIR CONDITIONER SUPER WASH-WOMEN-12FLOZ-20UN | CA | 20 |
| 14 | View | 10012 | 10554 | FERT | HAIR CONDITIONER SUPER WASH-MEN-12FLOZ-20UN | CA | 20 |
| 15 | Edit | 10013 | 10555 | FERT | HAIR CONDITIONER SUPER CLEAN-WOMEN-12FLOZ-20UN | CA | 20 |
| 16 | View | 10014 | 10987 | FERT | HAIR CONDITIONER SUPER CLEAN-WOMEN-12FLOZ-20UN | CA | 20 |
| 17 | View | 10015 | 10556 | FERT | HAIR CONDITIONER SUPER CLEAN-MEN-12FLOZ-20UN | CA | 20 |
| 18 | View | 10016 | 10557 | FERT | HAIR CONDITIONER SUPER NEAT-WOMEN-12FLOZ-20UN | CA | 20 |
| 19 | View | 10017 | 10558 | FERT | HAIR CONDITIONER SUPER NEAT-MEN-12FLOZ-20UN | CA | 20 |
| 20 | View | 10018 | 10559 | FERT | HAIR MOISTURIZER SUPER WASH-WOMEN-4FLOZ-60UN | | 30 |
| 21 | View | 10019 | 10560 | FERT | HAIR MOISTURIZER SUPER WASH-MEN-4FLOZ-60UN | CA | 30 |
| 22 | View | 10020 | 10561 | FERT | HAIR MOISTURIZER SUPER CLEAN-WOMEN-4FLOZ-60UN | CA | 30 |
| 23 | View | 10021 | 10562 | FERT | HAIR MOISTURIZER SUPER CLEAN-MEN-4FLOZ-60UN | CA | 30 |
| 24 | View | 10022 | 10563 | FERT | HAIR MOISTURIZER SUPER NEAT-WOMEN-4FLOZ-60UN | CA | 30 |
| 25 | View | 10023 | 10564 | FERT | HAIR MOISTURIZER SUPER NEAT-MEN-4FLOZ-60UN | CA | 30 |

FIG. 22

| | A | G | H | I | J | K | L | M | N | |
|---|---|---|---|---|---|---|---|---|---|---|
| 1 | Action | DIVISION | MATERIAL_GROUP | GROSS_WEIGHT | WEIGHT_UNIT | NET_WEIGHT | VOLUME | VOLUME_UNIT | EAN_UPC | EAN_C |
| 2 | View | 10 | 1040 | 10 | KG | 8.5 | 7.1 | L | 7941131743801 | VI |
| 3 | View | 10 | 1040 | 10 | KG | 8.5 | 7.1 | L | 7941131743901 | VI |
| 4 | View | 10 | 1040 | 10 | KG | 8.5 | 3.5 | L | 7941131744201 | VI |
| 5 | View | 10 | 1040 | 10 | KG | 8.5 | 3.5 | L | 7941131744201 | VI |
| 6 | View | 10 | 1040 | 10 | KG | 8.5 | | | 7941131637401 | VI |
| 7 | View | 10 | 1040 | 10 | KG | 8.5 | | | 7941131048701 | VI |
| 8 | View | 10 | 1040 | 10 | KG | 8.5 | | | 7941131743801 | VI |
| 9 | View | 10 | 1040 | 10 | KG | 8.5 | 7.1 | L | 7941131191901 | VI |
| 10 | View | 10 | 1040 | 10 | KG | 8.5 | 7.1 | L | 7941131876201 | VI |
| 11 | View | 10 | 1040 | 10 | KG | 8.5 | 3.5 | L | 7941131934101 | VI |
| 12 | View | 10 | 1050 | 10 | KG | 8.5 | 7.8 | L | 7941131666401 | VI |
| 13 | View | 20 | 1050 | 10 | KG | 8.5 | 7.8 | L | 7941131908001 | VI |
| 14 | View | 20 | 1050 | 10 | KG | 8.5 | 7.8 | L | 7941131123401 | VI |
| 15 | View | 20 | 1050 | | | | 7.8 | L | 7941131764801 | VI |
| 16 | Edit | 20 | 1050 | | | | 7.8 | L | 7941131988801 | VI |
| 17 | View | 20 | 1050 | 10 | KG | 8.5 | 7.8 | L | 7941131988801 | VI |
| 18 | View | 20 | 1050 | 10 | KG | 8.5 | 7.8 | L | 7941131477401 | VI |
| 19 | View | 20 | 1090 | 10 | KG | 8.5 | 7.8 | L | 7941131873301 | VI |
| 20 | View | 30 | 1090 | 10 | KG | 8.5 | 7.8 | L | 7941131096801 | VI |
| 21 | View | 30 | 1090 | 10 | KG | 8.5 | 7.8 | L | 7941131224301 | VI |
| 22 | View | 30 | 1090 | 10 | KG | 8.5 | 7.8 | L | 7941131450901 | VI |
| 23 | View | 30 | 1090 | 10 | KG | 8.5 | 7.8 | L | 7941131098701 | VI |
| 24 | View | 30 | 1090 | 10 | KG | 8.5 | 7.8 | L | 7941131768501 | VI |

FIG. 23

| | A | G | H | I | J | K | L | M | N | |
|---|---|---|---|---|---|---|---|---|---|---|
| | | | | | | | | | TYPE A QUESTION FOR HELP | |
| 1 | Action | DIVISION | MATERIAL_GROUP | GROSS_WEIGHT | WEIGHT_UNIT | NET_WEIGHT | VOLUME | VOLUME_UNIT | EAN_UPC | EAN_CA |
| 2 | View | 10 | 1040 | 10 | KG | 8.5 | 7.1 | L | 79411317743801 | VI |
| 3 | View | 10 | 1040 | 10 | KG | 8.5 | 7.1 | L | 79411317743901 | VI |
| 4 | View | 10 | 1040 | 10 | KG | 8.5 | 3.5 | L | 79411317744201 | VI |
| 5 | View | 10 | 1040 | 10 | KG | 8.5 | 3.5 | L | 79411317744201 | VI |
| 6 | View | 10 | 1040 | 10 | KG | 8.5 | | | 79411316637401 | VI |
| 7 | View | 10 | 1040 | 10 | KG | 8.5 | | | 79411310148701 | VI |
| 8 | View | 10 | 1040 | 10 | KG | 8.5 | 7.1 | L | 79411317743801 | VI |
| 9 | View | 10 | 1040 | 10 | KG | 8.5 | 7.1 | L | 79411311191901 | VI |
| 10 | View | 10 | 1040 | 10 | KG | 8.5 | 3.5 | L | 79411311876201 | VI |
| 11 | View | 10 | 1040 | 10 | KG | 8.5 | 3.5 | L | 79411311934101 | VI |
| 12 | View | 10 | 1050 | 10 | KG | 8.5 | 7.8 | L | 79411316656401 | VI |
| 13 | View | 20 | 1050 | 10 | KG | 8.5 | 7.8 | L | 79411311908001 | VI |
| 14 | View | 20 | 1050 | 10 | KG | 8.5 | 7.8 | L | 79411311123401 | VI |
| 15 | Edit | 20 | 1050 | | KG | 8.5 | 7.8 | L | 79411317764801 | VI |
| 16 | View | 20 | 1050 | 10 | KG | 8.5 | 7.8 | L | 79411311988801 | VI |
| 17 | View | 20 | 1050 | 10 | KG | 8.5 | 7.8 | L | 79411311988801 | VI |
| 18 | View | 20 | 1050 | 10 | KG | 8.5 | 7.8 | L | 79411311477401 | VI |
| 19 | View | 20 | 1090 | 10 | KG | 8.5 | 7.8 | L | 79411311873301 | VI |
| 20 | View | 30 | 1090 | 10 | KG | 8.5 | 7.8 | L | 79411310096801 | VI |
| 21 | View | 30 | 1090 | 10 | KG | 8.5 | 7.8 | L | 79411311224301 | VI |
| 22 | View | 30 | 1090 | 10 | KG | 8.5 | 7.8 | L | 79411311450901 | VI |
| 23 | View | 30 | 1090 | 10 | KG | 8.5 | 7.8 | L | 79411310098701 | VI |
| 24 | View | 30 | 1090 | 10 | KG | 8.5 | 7.8 | L | 79411311768501 | VI |

FIG. 24

DATA CONSTRUCTION FOR EXTRACT, TRANSFORM AND LOAD OPERATIONS FOR A DATABASE

PRIORITY

The present application claims priority under 35 U.S.C. 119(a)-(d) to Indian Patent Application 2683/CHE/2014, filed Jun. 2, 2014, which is incorporated by reference in its entirety.

BACKGROUND

Extract, transform and load (ETL) refers to operations for populating a database which may be used in a data warehouse. The data warehouse may provide data reporting and other data analysis functionality using the database.

In many instances, the data warehouse may be used to store massive amounts of data that may be provided by many different sources, and the data may be provided from the sources in an unstructured format or a format that is different from what can be understood by the database. The data from the data sources is loaded into the database, and the database organizes the data using various fields defined by the database administrator when the database is created. By storing the unstructured data in an organized manner in the database, queries, reporting and other data analysis functions can be performed on the data.

ETL operations can facilitate the loading of the data from many different data sources into the database by transforming the data prior to the loading. The transforming may include formatting the data from the data sources to a format that is usable by the database.

BRIEF DESCRIPTION OF DRAWINGS

The embodiments of the invention will be described in detail in the following description with reference to the following figures.

FIGS. 5-6 illustrate examples of screen shots for entering field mappings and field information, according to embodiments;

FIGS. 8A-B illustrates example of fields in a filter table, according to embodiments;

FIGS. 10-11 illustrate examples of screen shots showing different modes of operation for data construction, according to embodiments;

FIGS. 17-24 show examples of screen shots illustrating various functionalities for data construction, according to embodiments.

DETAILED DESCRIPTION OF EMBODIMENTS

Figure 1:
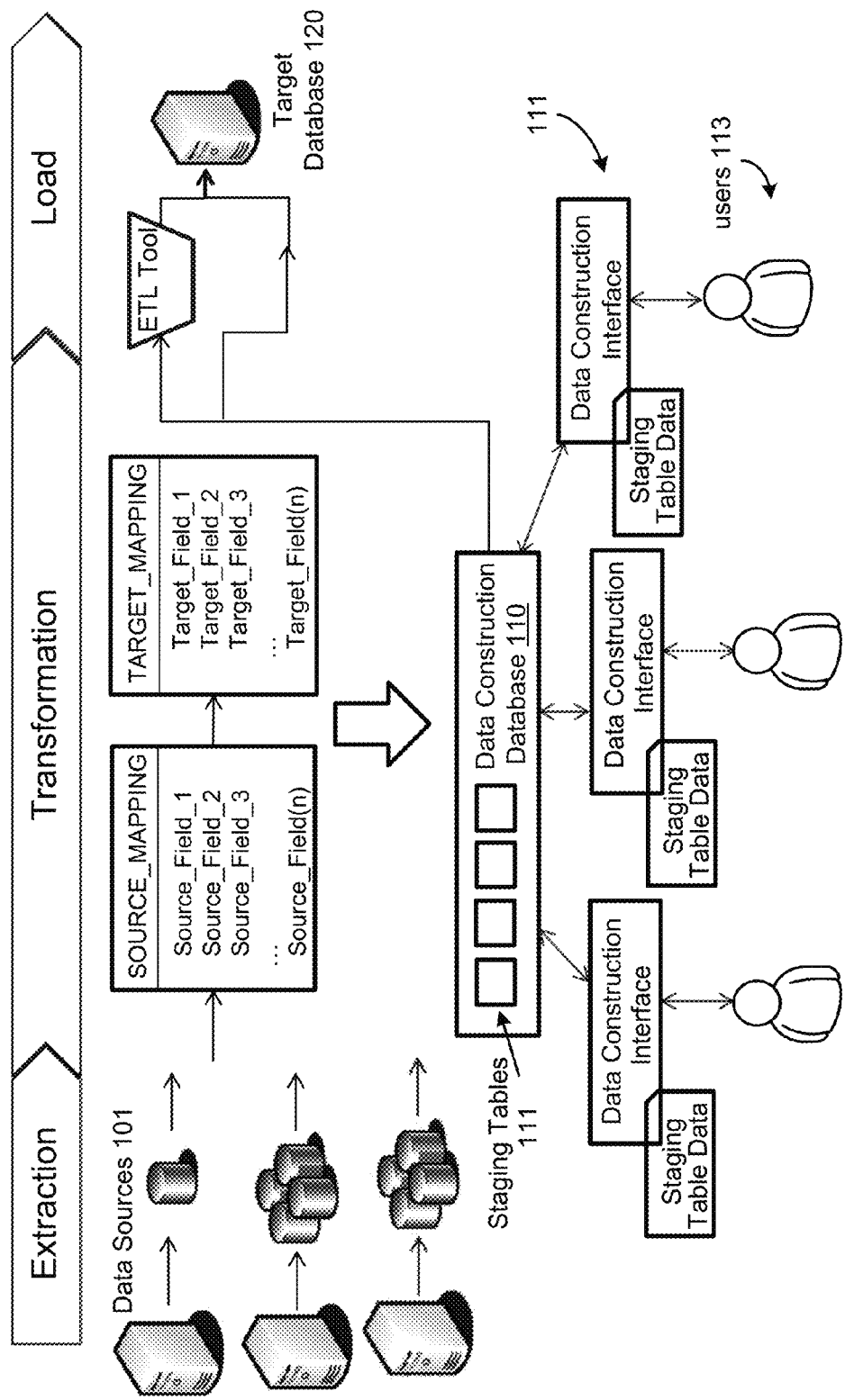
FIG. 1 illustrates an ETL process and data construction, according to an embodiment.

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

According to embodiments, a data construction system provides an extensible, interim platform for transitioning data from a legacy database or other data sources to a target database. The data construction system performs data construction. Data construction may include operations for creating and adding data, editing data, and deleting data. The data construction which may be used for data transformation in ETL operations. The data created by the data construction, for example, either does not exist in the data provided by the data sources or may be difficult to derive from the data sources. In one example, the data sources are legacy data source systems and the data construction system can migrate data from the legacy data source systems to the target database, which may be used by current business operations and applications.

The data construction system provides a front end that is end-user friendly. Through the front end, end users can interact with a back-end of the data construction system to provide input for data construction. The front end may include a spreadsheet application and/or a graphical user interface (GUI) generated by the data construction system. The backend may include a database management system hosted by a database server and include a data construction database and configuration information.

The data construction system provides multi-level user access checks, such as a user access check at the database level and a user access check at the data object level. For example, the user access check at the data object level may be performed after connecting to the database, and the system can query configuration tables to check which construction data objects the user can access, which may be based on a role assigned to the user. A role can be the functions, operations, or responsibilities assigned to a user based on a situation. For example, a company's employees or organization's workers may each have one or more roles depending on the department they are assigned to, such as an accounting role, sales role, information technology role, etc.

Also, the data construction system enables users to define and enforce validation rules. The validation rules for example can be database table-level validation and field-level validation. The validation can be performed in the data construction system during data construction. Validation in the data construction system may include controlling the data created for the database according to validation rules. For example, the validation performed in the data construction system includes restricting data through validity or null checks. For example, the system prompts the user to enter details regarding mandatory construction fields to identify data missing for the fields or to identify NULL values entered for the fields when non-null values are required. Also, the system provides real-time validation error reporting with highlighted error cells and error strings.

Multiple users can be restricted from performing data construction operations at the same time on the same records in the same table by using check-in-check-out process. In one example, the check-in-check-out process is accomplished through a flag stored in the data construction database. For example, if a flag is checked, the system will not allow any user other than the one who has the data checked out to make any edits.

The data construction system can manage users in one or more locations, and use role-based techniques to grant access to data and provides an end-user friendly interface that automatically notifies of validation errors and creates data when needed to facilitate loading into the target database.

Existing database systems may have ETL tools but may not have tools for data construction even though data construction may be part of the ETL process. In some instances, it has been observed that different users managing the ETL process make copies of the data to load into the live database tables. In these situations, it is difficult to facilitate security checks to confirm whether a user is authorized to access certain data objects. Also, it is difficult to enforce data validation rules if the user is editing copies of the data as compared to making edits through the database. Also, different users may be editing the same data which is inefficient. Also, a user may be unclear as to whether they are editing the most recent data. As generally discussed above and discussed in further detail below, the data construction system of the present disclosure implements an architecture and procedures to enforce user security and data validation rules during data construction. Also, the data construction system provides a user interface that facilitates multiple users to engage in data construction through an easy-to-use interface and prevents users from working on outdated content.

FIG. 1 illustrates a data construction system 100 to perform data construction which may be part of an ETL process. For example, data may be extracted from one or multiple data sources 101, which may include a legacy system. The data sources 101 may include database servers that host one or more legacy databases. The data of the legacy databases may be transferred to a target database 120 through the data construction system 100. The data construction system 100 facilitates data construction operations for the ETL process to transform the data from the data sources 101 for loading into the target database 120. In addition to legacy databases, the data sources 101 may include other types of systems that generate data to be loaded into the target database 120. The data sources 101 may include business applications or may include external data sources, such as data provided from external public or private entities.

Mappings may be stored for each data source that map the fields for each data source to the fields of the target database 120. During the transformation phase of the ETL process, data from the sources 101 is mapped to fields of the data construction database 110 according to the stored mappings, and the data is loaded into a data construction database 110. The data construction database 110 for example includes the fields of the target database 120 so the data can be loaded from the data construction database 110 into the target database 120 with minimal processing.

The data construction database 110 is comprised of tables 111 for loading the data from the data sources 101. The tables 111 are referred to as staging tables 111 because they are intermediate tables for processing data from the data sources 101 before loading the data into the target database 120. The staging tables 111 for example include the fields of the tables of the target database 120 and are database tables.

Some of the features of the data construction system 100 are to facilitate building data content and new records; the system 100 can be used for any data objects; and multiple users can have access to the same data via data construction interfaces, which may include a spreadsheet application or another type of graphical user interface for data construction. For example, FIG. 1 shows multiple users 113 accessing the data in the data construction database 110 simultaneously through data construction interfaces 114. The users 113 may view instances 112 of the data from the staging tables 111 simultaneously via the data construction interfaces 114. Also, the users 113 may edit data and add data for data construction through their respective data construction interface using a check-in-check-out process described in detail below. Also, during the data construction, validation rules and user authentication are enforced as is further described below.

After data construction is performed, data may be loaded from the staging tables 111 into the target database 120. The data construction system 100 performs data construction and validation and transformation, such as converting data types to types required for the target database 120, verifying particular fields have non-null data if required, etc. Also, some additional transformation may be optionally performed by an ETL tool of the target database system when transferring data from the data construction database 110 to the target database 120. The target database may include a target database server hosting the target database 120.

Figure 2:
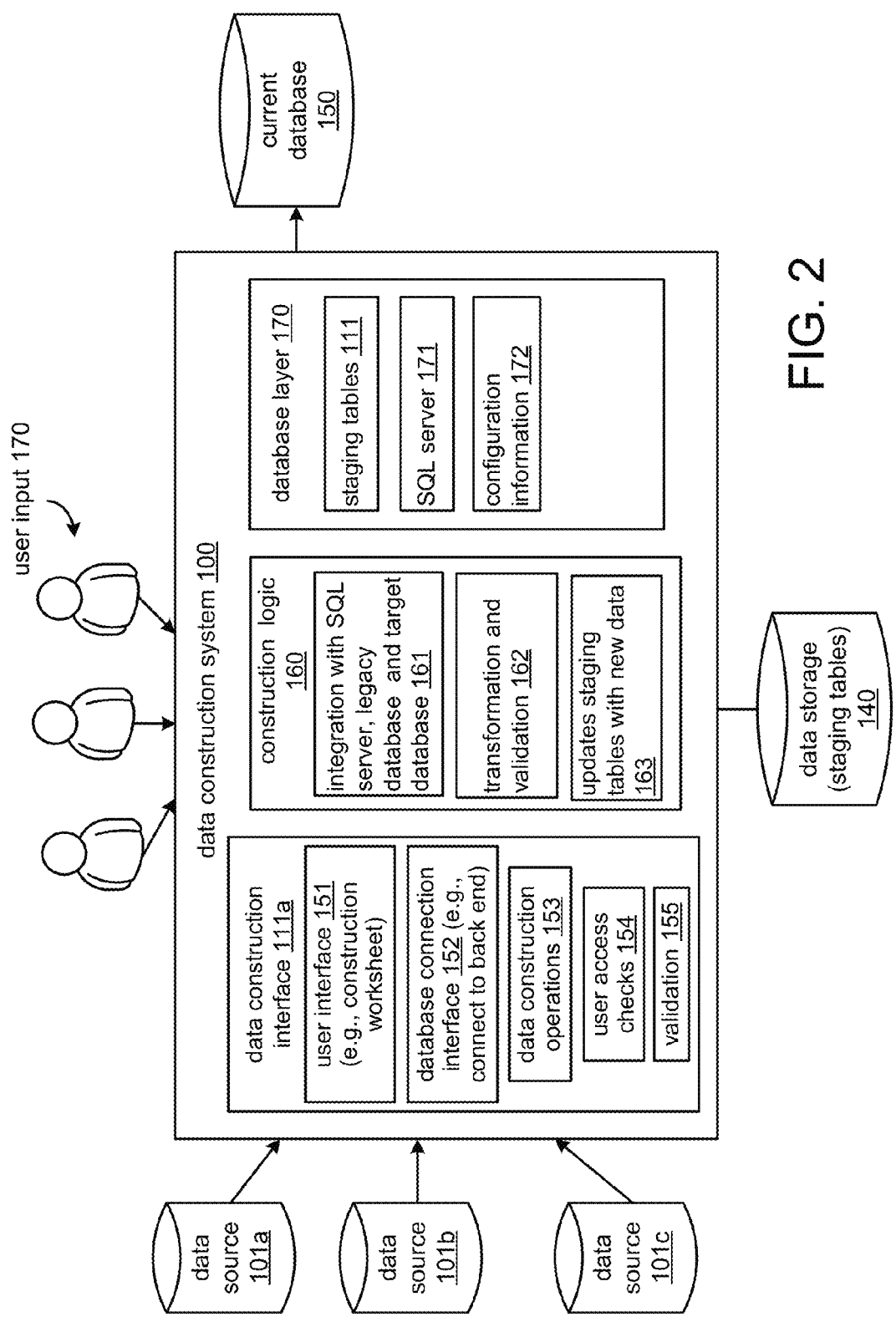
FIG. 2 illustrates a data construction system, according to an embodiment.

FIG. 2 illustrates a block diagram of the data construction system 100. Data from data sources 101 is received for example during extraction of the ETL process and the data may be stored in the data storage 140, which may include the staging tables 111 for the data construction database 110 shown in FIG. 1. The data storage 140 may store other information, such as the source-to-target mappings, validation rules, primary key and foreign key relationships, configuration information or any information used by the system 100.

The data construction system 100 may include the data construction interfaces 111. Data construction interface 111*a* is shown but multiple data construction interfaces 111 may be in the data construction system 100. The data construction interfaces 111 for example are the front-end of the data construction system 100 and include a user interface 151, database connection interface 152, and execute data construction operations 153, multi-level user access checks 154 and validation 155. The user interface 151 may be a GUI. In one example, it is a data construction worksheet in a spreadsheet application, such as EXCEL. Data from the staging tables 111 may be viewed thru the user interface 151 and data construction operations 153 may be performed via the user interface 151. The database connection interface 152 may include an application program interface (API) to connect to a database management system and/or a network interface. The multi-level user access checks 154 and validation 155 are described in detail below.

The data construction system 100 also includes a back-end comprised of a database management system. The front end comprised of the data construction interfaces 111 may be hosted on a server or hosted by multiple end user devices, such as personal computers, tablets, and other mobile devices. The database management system of the back end may be hosted on a database server separate from the front end. The front end and the back end may be connected by one or more networks.

The database management system of the back end for example includes construction logic 160 and a database layer 170. The construction logic 160 integrates with the data sources 101 to load data into the staging tables 111 and integrates with the target database 120 to load data into the target database 120 from the staging tables 111. The construction logic 160 also includes intelligence for transformation and validation 162, and performs updates 163 of the staging tables 111 with new data determined from the data construction operations 153. The database layer 130 may include SQL server 171 or another type of database front-end to execute queries and perform other database management functions. The staging tables 111 and configuration information 172 are logically shown as part of the database layer 170 but may be stored in the data storage 140. The configuration information may include configuration tables for user access checks, validation rules, field mappings, etc. The configuration tables may include information for determining role-based user access privileges.

Figure 3:
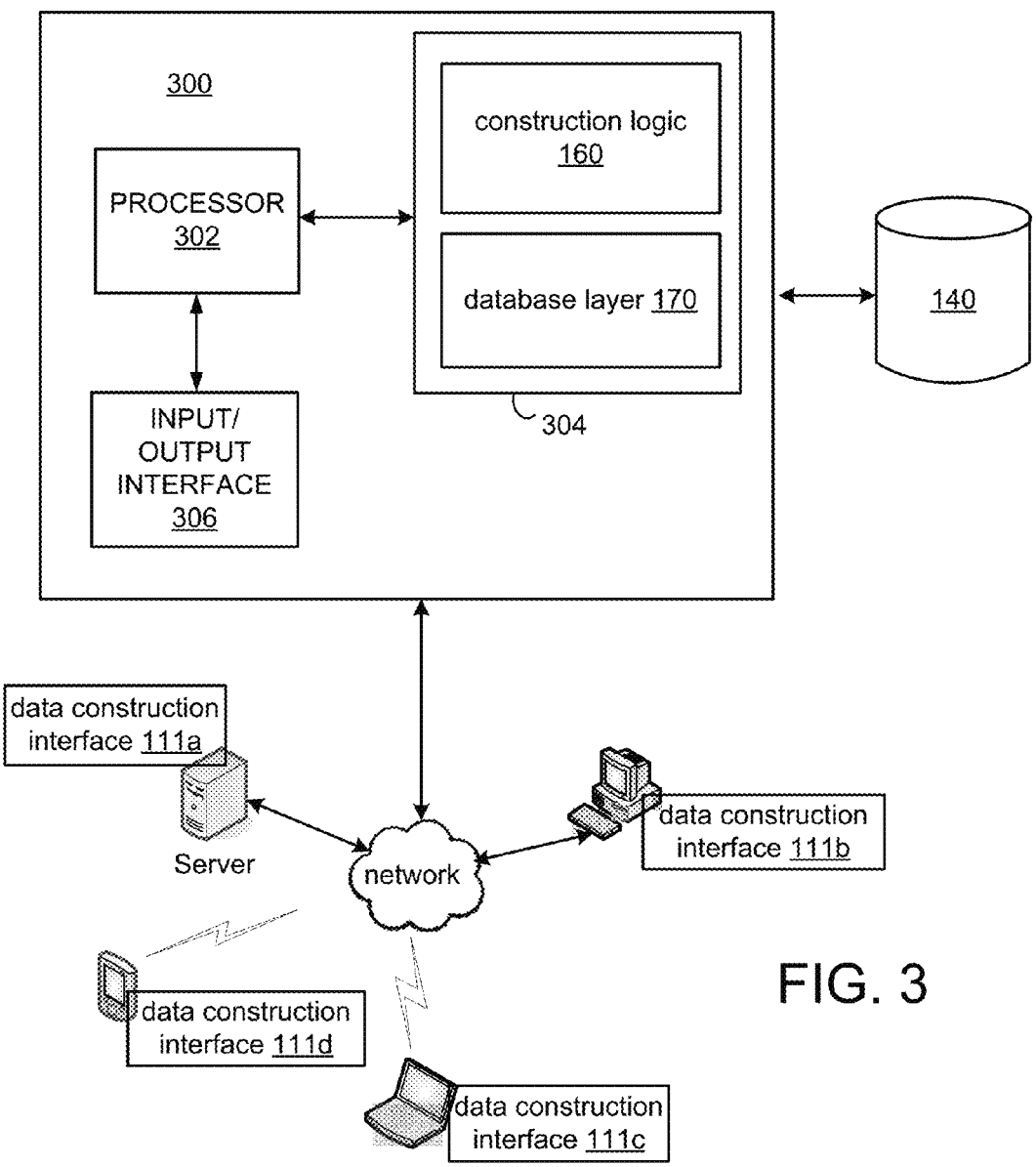
FIG. 3 illustrates a computer system that may be used as a platform for the data construction system and executing various functions for data construction, according to an embodiment.

FIG. 3 illustrates a computer platform 300 that may be used for the backend of the data construction system 100. For example, the platform 300 may be a server or another computer and includes, for example, a processor 302, a data storage device 304, and a network interface 306. Also, the components are shown in a single computer as an example and in other examples the components may exist on multiple computers and the components may comprise multiple processors, data storage devices, interfaces, etc.

The data storage 304 may include a hard disk, memory, etc. The data storage 304 may store any data used by the system 100. The processor 302 may be a microprocessor, a micro-controller, an application specific integrated circuit (ASIC), field programmable gate array (FPGA), or other type of circuit to perform various processing functions.

In one example, the construction logic 160 and the database layer 170 and other functions of the data construction system 100 comprise machine readable instructions stored on the data storage device 304 and executed by the processor 302. In another example, one or more of the function of the data construction system 100 are performed by a customized circuit, such as an application-specific integrated circuit (ASIC), field-programmable gate array (FPGA), or an embedded system.

The input/output (I/O) interface 306 comprises a hardware and/or a software interface. The I/O interface 306 may be a network interface connected to a network, such as the Internet, a local area network, etc. For example, the back end of the data construction system 100 may be connected to the front data construction interfaces 111 a-d via a network and the front end data construction interfaces 111 a-d may be hosted on servers, end user devices or other computers. The data construction interfaces 111a-d may comprise machine readable instructions stored on a data storage device in their respective computers and executed by a processor in their respective computers. Although not shown, the backend of the system 100 may be connected to the data sources 101 and the target database 120 via the network. In one example, the data construction database 110 and the target database 120 are managed by the same database management system and may be hosted by the same database server or cluster of servers.

The data construction interfaces 111a-d may be data construction worksheets executed by a spreadsheet application and have macros to perform the function of the data construction interfaces 111a-d. The backend may comprise software as indicated above. Once a data construction worksheet is generated it can be operated with the backend using its macros and interfaces, which may include dynamic-link libraries and APIs.

Figure 4:
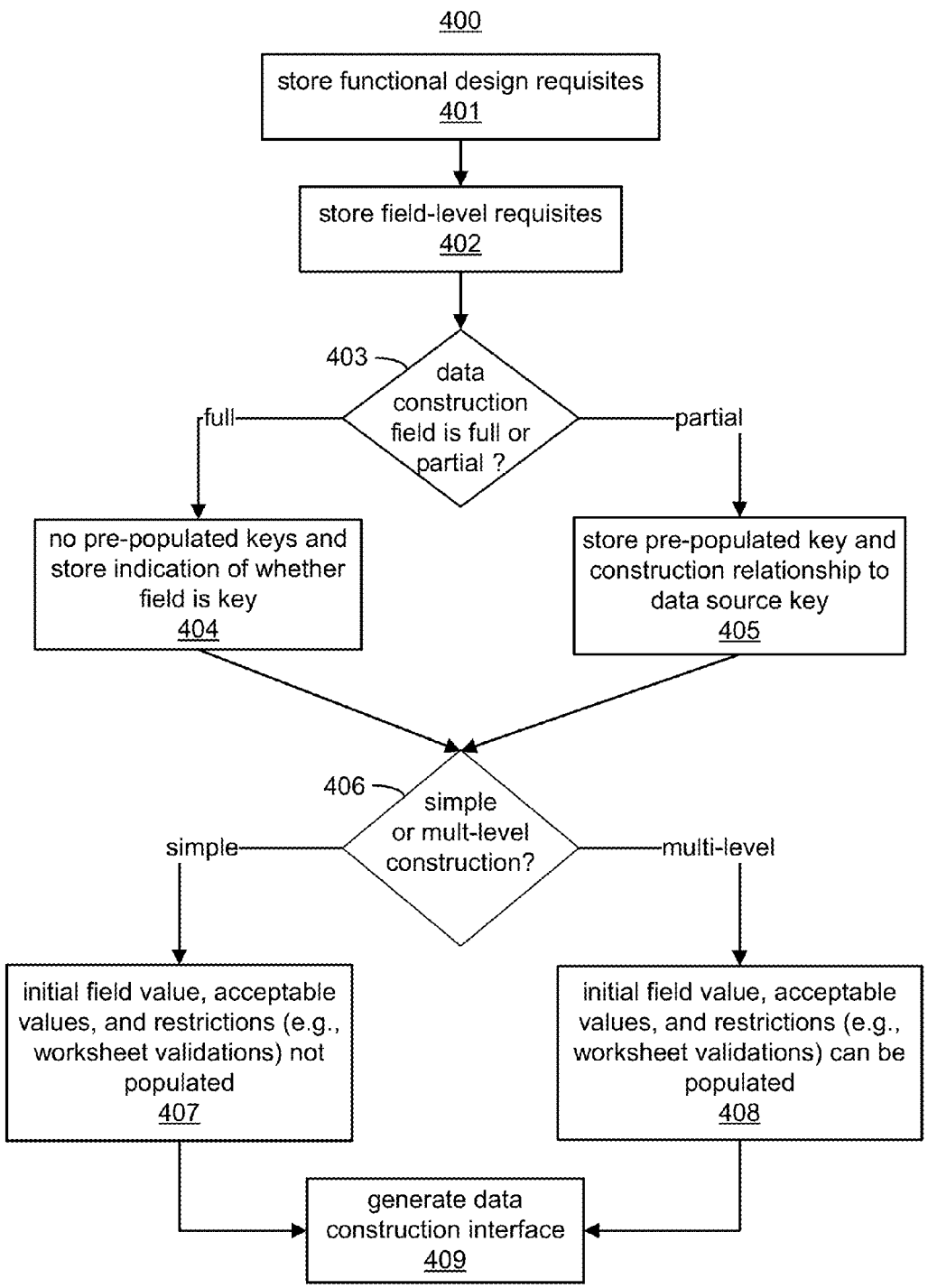
FIG. 4 illustrates a flow chart for determining requirements for data construction, according to an embodiment.

FIG. 4 illustrates a flow chart of a method 400 for determining requirements for data construction and generating the data construction interfaces 111 to meet the requirements. The method 400 is described with respect to the system 100 shown in FIGS. 1-3 by way of example and the method may be performed by other systems. At 401, functional design requisites are stored in the system 100, such as in the data storage 140. The functional design requisites define the construction requirements at the object level for data objects, including construction type, construction estimated volume, construction validation required, and prerequisites and dependencies to other conversion objects. The validation rules may be specified in the functional design requisites for each object. The validation rules may specify the requirements that must be met by data in the data construction database 110. Also, data construction validation report requirements may be specified in the requisites. For each data object, the functional design requisites may specify the data source of the data sources 101, the construction type and the complexity. Complexity may refer to whether there is more than one staging table of the staging tables 111 for the data object. The functional design requisites may be entered through the user interface 151.

At 402, field-level requisites are stored in the system 100, such as in the data storage 140. The field-level requisites may include field mappings, transformations, and field-level data construction requirements. The field mappings describe the mappings of the fields from the sources 101 to the fields in the construction database 110 and the target database 120. The field-level construction requirements define the construction requirements at the field level, including field type, relevancy rules, data type, data length, acceptable values, and validation checks. Transformation requirements may be specified for pre-construction, such as when loading data into the data construction database 110 and post construction, such as prior to loading data into the target database 120. The field-level requisites may be entered through the user interface 151.

FIG. 5 shows a screenshot for entering mappings from a source of the sources 101 to target fields in the data construction database 110. The field level mappings are defined in the source table and source field columns and the field transformation requirements are defined in the rule type, detailed rule instruction, and default value columns. Information for the corresponding target fields for each source field is entered in the target field columns.

The field-level requisites stored at step 402 include field-level data construction requirements which are used during the data construction. Data construction fields are identified that include fields where data can be entered, deleted or modified during the data construction process. Examples of the field-level data construction requirements are described below with respect to FIG. 6 which shows an interface for entering field-level data construction requirements. The field-level data construction requirements include a mandatory fields matrix that distinguishes which fields are mandatory, optional, or not used based on the field type. The fields type shown in FIG. 6 may include the following types:

Pre-Populated—Key: Define the source system reference key fields that will be used to merge the construction data with the source system data;

Pre-Populated—Support: Define the source system support fields that will assist the user in creating construction data;

Construction—Restricted: Define the construction fields that have restricted values and provide list of acceptable values and/or restrictions during construction;

Construction—Open: Define the construction fields that do not have restricted values; and Conditional—Define the conditional fields that are dependent on the reference keys, support, and construction fields and provide list of acceptable values and/or restrictions during construction.

The field-level data construction requirements include defined field names for data construction fields. The field names that are stored will appear in the user interface during data construction, e.g., a data construction worksheet, and in the staging tables 111. A column for entering field names is shown in FIG. 6. A key relationship column is also shown in FIG. 6. For full construction, reference keys are defined. For partial construction, the relationship between the data construction field and the source system reference keys for each data construction field are defined. Full construction is when data from a data source field is not available or is not used for the data construction field. Partial construction is when at least some data from a data source field is used for the data construction field.

A required column in FIG. 6 is for entering data construction fields that are required, for example, with a 'Y'. Conditionally required fields are not defined in this column. For example, a conditionally required field may be defined as: Field B must be populated if Field A='X'. In this example, Field B should not be defined as a required field.

A source system, source table, and source field may be entered for each data construction field if there is a related source system, source table, and source field for the data construction field. Source notes may be provided to further describe requirements on how the pre-populated construction fields should be populated in the construction worksheet.

The initial field value column shown in FIG. 6 is for construction fields that is initially populated in the construction worksheet. The initial field value requirement is different than a default value requirement because the populated initial field value may still be changed by the user whereas a default value cannot be changed by the user. For fields that do not have an initial field value populated, this column blank is left blank.

Columns are also shown in FIG. 6 for acceptable values (e.g., in a dropdown list), restrictions (e.g., worksheet validation), and backend validation. The acceptable values are entered and will be inserted in the construction worksheet as a dropdown for construction fields. Restrictions requirements are defined for construction fields that will be validated in the construction worksheet, which may be performed by the presentation interface 150 shown in FIG. 2. For example, Field C must be numeric or Field D must be numeric and include 2 leading zeroes. DS validation is backend validation which may be performed by the construction logic 160 shown in FIG. 2. Backend validation requirements for construction fields are defined. For example, Field E<>'Y'.

Referring back to FIG. 4, at 403, to store field-level data construction requirements, the system 100 determines whether the data construction for a data construction field is a full or partial data construction, whereby partial data construction includes data from at least one of the data sources 101 and full does not. User input which may be provided through a user interface, such as shown in FIG. 6, and may be received to indicate whether the construction is partial or full. If the data construction is full, at 404, the field type column shown in FIG. 6 does not include a 'Pre-Populated—Key'. The user interface for example does not allow a 'Pre-Populated—Key' field type for full construction but at 405, for partial construction, at least one 'Pre-Populated—Key' field type must be entered. Also, at 404, the key relationship column shown in FIG. 6 includes a 'Y' or 'N' flags for full construction to define which construction fields are keys and must include the construction field relationship to the data source key for partial construction at 405. The construction field relationship may identify whether there is a key relationship, such as whether the construction field is a primary key or foreign key.

At 406, the system 100 determines if the data construction is simple construction, such as one construction worksheet and one staging table of the staging tables 111, or multi-level construction, such as multiple construction worksheets and staging tables. The user may identify whether the data construction is for a simple or multi-level construction. For simple construction, at 407, the initial field value, acceptable values, and restrictions (e.g., worksheet validation) columns in FIG. 6 are not populated because there will be no additional logic added to the construction worksheet for performing data construction. These columns may be greyed out to prevent user input. All validation is entered in the DS validation column and may be performed by the backend.

For multi-level construction, at 408, the initial field value, acceptable values, and restrictions can be populated because additional logic will be added to the Construction Worksheet. The restrictions column may include validations and the DS Validation column may include validations. The validations for the backend validation may be more complex.

At 409, a data construction interface is generated that meets the functional design requisites and the field-level requisites determined from the steps above. The user interface for example is a construction worksheet, examples of which are describe below. The construction worksheet may be a worksheet in a spreadsheet including macros that enforce the functional design requisites and the field-level requisites. In another example, the user interface may be a GUI generated by a computer program implementing the data construction system 100. Many programming languages are available, including visual basic, to generate GUIs which may be event driven based on user input. A template may be used as a starting point to build the user interface according to the functional design requisites and the field-level requisites. In one example, the template is a worksheet in the spreadsheet program if the user interface is a construction worksheet in the spreadsheet program.

Figure 7:
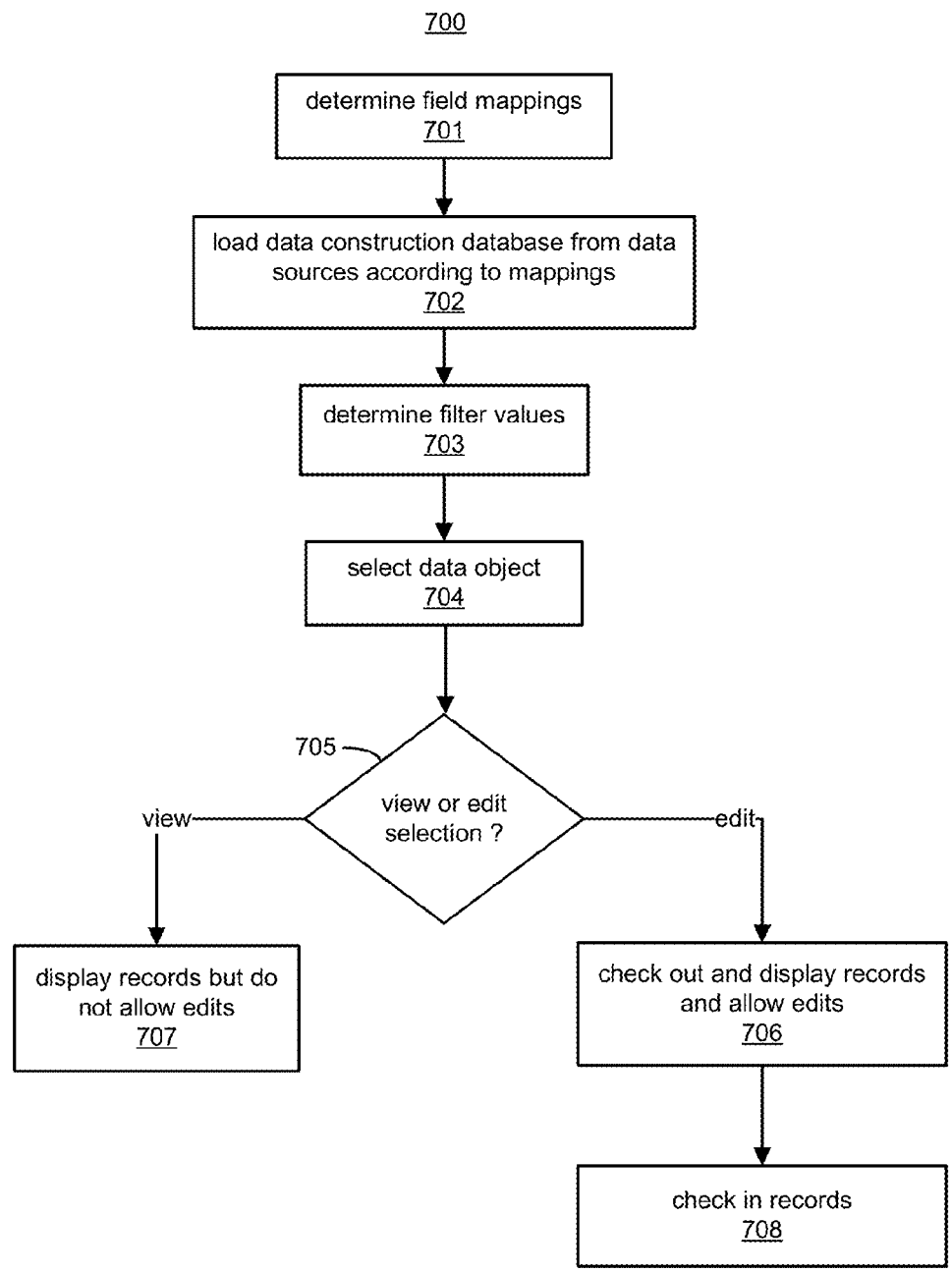
FIG. 7 illustrates a flow chart for loading data into a user interface to facilitate data construction, according to an embodiment.

FIG. 7 illustrates a method 700 for loading data into any of the data construction interfaces 111 to facilitate data construction. The method 700 and other methods described below are described with respect to the data construction system 100 shown in FIGS. 1-3 by way of example and the methods may be performed by other systems.

At 701, mappings are determined from source fields in the data sources 101 to target fields in the data construction database 110. The target fields are provided in the staging tables 111 of the data construction database 110. There may be one or more staging tables 111.

At 702, the data construction database 110 is loaded with data from the data sources 101 according to the mappings. For example, data from the source fields is stored in the corresponding target fields. Data may be received in batch jobs or may be received more frequently from the data sources 101 and stored in the corresponding target fields of the staging tables 111. Steps 701 and 702 may be repeated at predetermined intervals or as new data is received from the data sources 101.

At 703, filter values are determined for filtering data for data construction. For example, records in the data construction database 110 which the user can access and which have the filter values specified at 703 can be checked out, and after being checked out data construction operations can be performed on the records. For example, through the user interface of the system 100, during a setup phase, the user enters values in a filter table that they would like to filter data on. Selection criteria may change as per the object selected for data construction. FIG. 8A illustrates example of fields in a filter table for entering filter values. The fields 'zBusinessUnit' and 'Object' may be required, while 'Status' and 'User' are not. zBusinessUnit is the business unit that the user would like to filter their data on. Some users will have difference permissions than others. Object is the object that the user wants to construct data for. Status is the construction status that the staging data will be filtered on upon import. User is username that the staging data will be filtered on upon import (the records that this user currently has checked-out). FIG. 8B shows another example of filter fields for a data object. In one example, the data object includes all data in a staging table. The filter fields include UNIQUE_ID: Unique number assigned to a record; LEGACY_VALUE: Legacy value (e.g. KG) that needs to be enriched; and SAP_VALUE: SAP Value that will be used for enrichment (e.g. LBS). The user of a construction worksheet may filter their data on as many fields as possible. This will cause a smaller subset of data to be checked out to that user, and allow the access of more records to other concurrent users.

At 704, a data object is selected. In one example, records for a data object are stored in a staging table so a staging table is selected. As is further described below, a multi-level user access check is performed to determine whether the user has rights to access the data construction database 110 and data objects in the database 110. A drop down menu may be shown identifying all the data objects the user has rights to access and the user can select one, assuming the user also has rights to access the data construction database 110. At 705, a view or edit selection is received from the user. Records are imported from a selected staging table (in the data construction database 110 to the data construction interface, e.g., the construction worksheet, according to the selection. The importing of records includes importing records that the user has privileges to view or edit. At 706, if edit is selected, a check-out process is performed. The checkout process may include checking out the imported records to the current user if they are not already checked out by someone else. The checked out records for example are the records in the staging table that match the filter values. When records are imported in 'Edit' mode, they can be modified by the user and saved back to the data construction database 110. At 707, if view is selected, the records are displayed to the user via the user interface, not allowing any changes to be made (e.g., read-only).

If records are checked out at 706, no other users can edit the records in the data construction database 110 via the user interface. For example, construction worksheets, which is an example of the data construction interfaces 111, may be launched by several users simultaneously, and as shown in FIG. 1, data from a staging table may be simultaneously imported and stored and viewed in the construction worksheets. However, only one of the users may edit the data for the same record at any given time by checking the record out. However, multiple users may view the same data simultaneously at 707 but cannot edit unless checked out by that user. At 708, after checking out data records, the data records are checked in by the user, such as when the user is done with data construction.

In one example, the data construction system 100 performs the check-in-check-out functionality through flags in the staging tables 111 for each record or for each table. If this flag indicates checked out, the construction worksheet does not allow any user other than the one who has the data checked out to make any edits. However, edits could still be made in the data construction database 110 for example through the database layer 170 by a database administrator. The flag is removed when the records are checked in. Also, data from a staging table may be initially imported in 'View' mode, whereby the user can view the data but not edit it. Then, the user can change to 'Edit' mode for example to fix data validation errors. To change to 'Edit' mode, the user checks out the records, however, the records cannot be checked out if they are currently checked out by another user.

Figure 9:
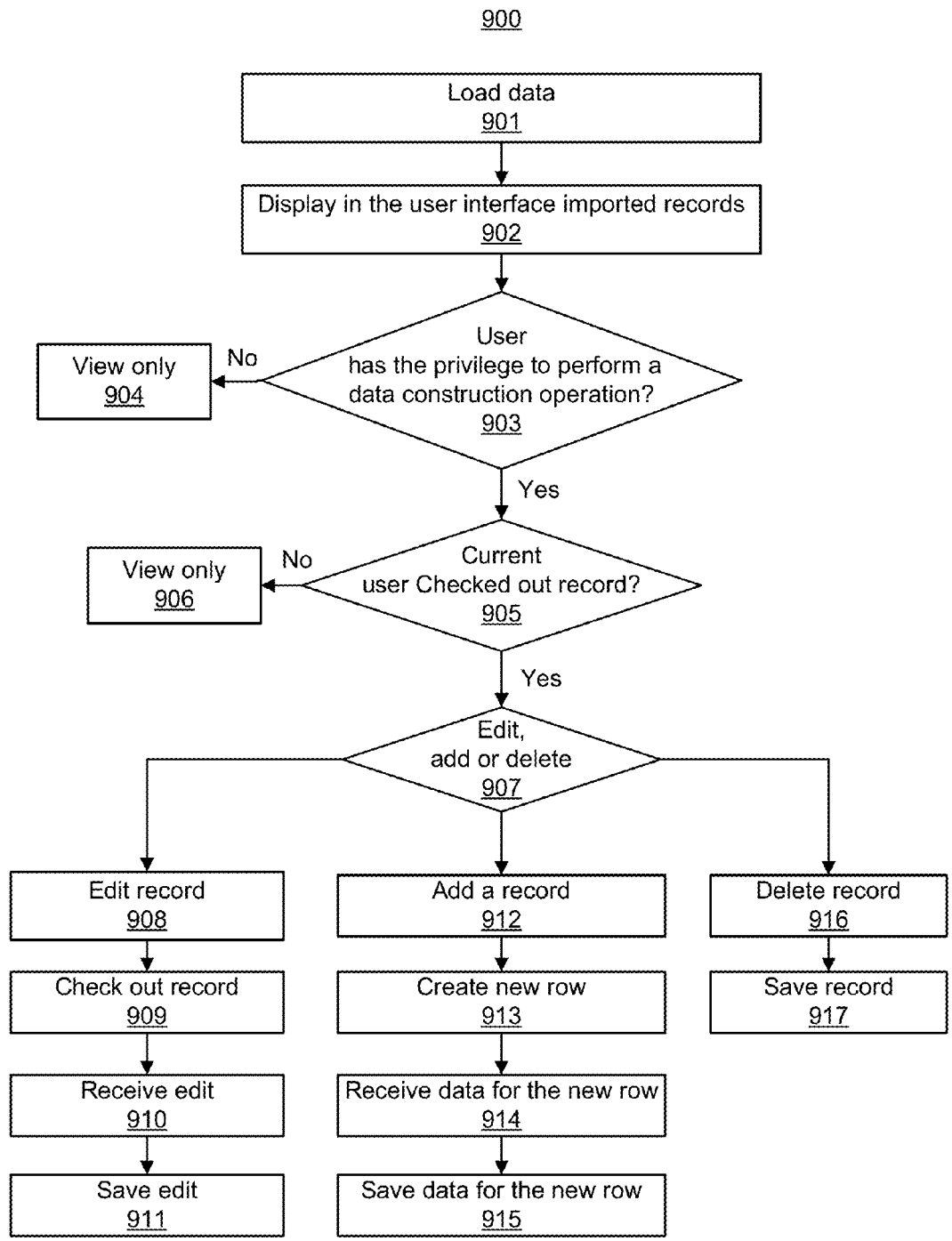
FIG. 9 illustrates a flow chart for a data construction process, according to an embodiment.

FIG. 9 illustrates a method 900 for the data construction process. At 901, the data is loaded. For example, data from the data construction database 110 is imported into the user interface, such as the construction worksheet, as described above in the method 700.

Figure 16:
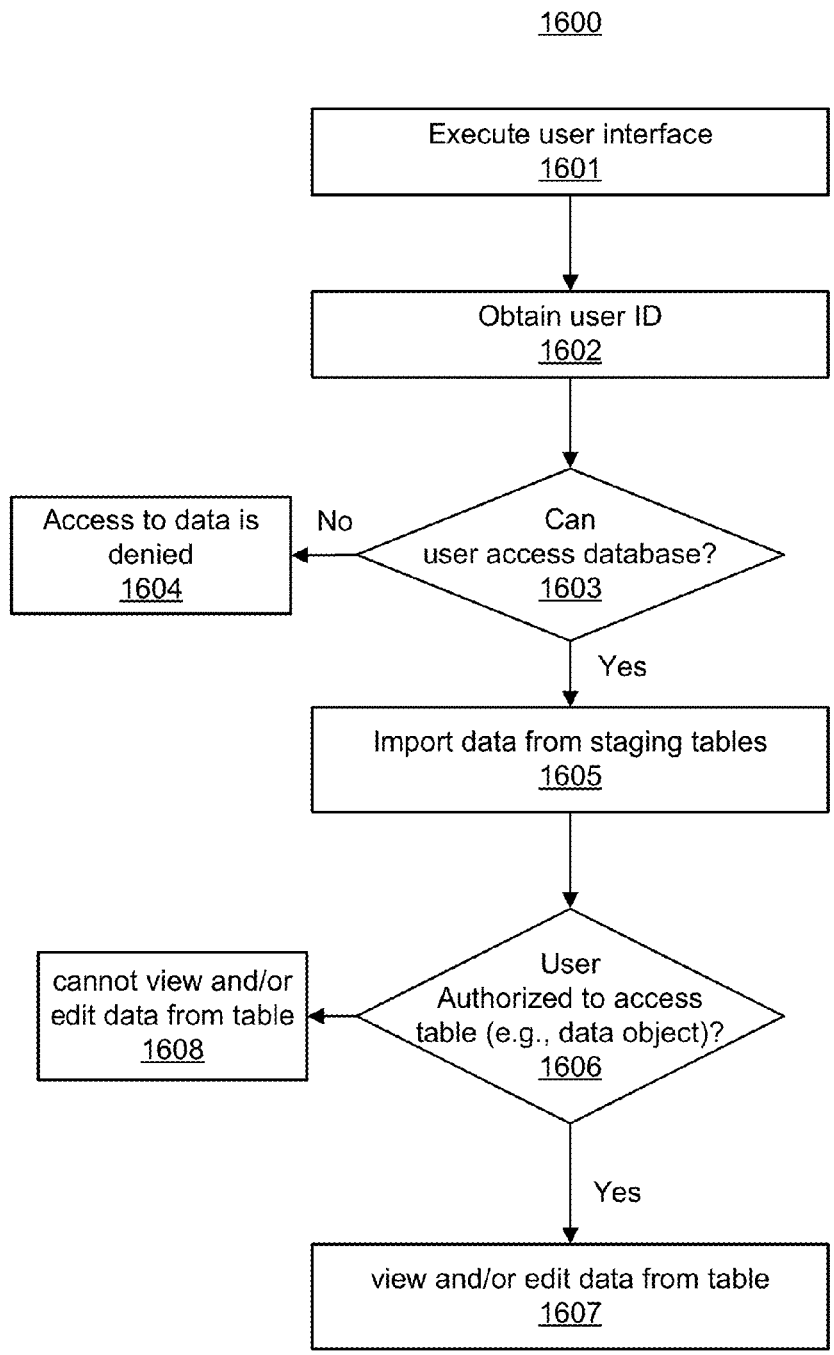
FIG. 16 shows a flow chart for multi-level user access checking, according to an embodiment.

At 902, imported records are displayed in the data construction interface (e.g., construction worksheet). At 903, a determination is made based on the user privileges for a data object, whether the user has the privilege to perform a data construction operation, such as editing a displayed record, adding a record or deleting a record, which is further described below with respect to FIG. 16 showing multi-level user access checking. If the user does not have the privileges, at 904, the records may be viewed, assuming the user has viewing privileges, but the data construction interface does not allow the data operation to be performed.

At 905, if the user has privileges to perform the data operation, a determination is made as to whether the current user has checked out a record for which a data operation is desired to be performed or if the record is checked out by another user. If the record is checked out by another user, at 906, the record may be viewed, but the construction worksheet does not allow the data construction operation to be performed on the record by the user until the record is checked in. A field may be shown in the construction worksheet for indicating who has the record currently checked out and when it was checked out.

If the record is not checked out, a data construction operation, such as editing a displayed record, adding a record or deleting a record, is allowed at 907.

At 908, to edit a record, an 'Action' column for the record is changed from 'View' to 'Edit' if it is not already shown as 'Edit'. FIG. 10 shows an example of screenshot for changing from 'View' to 'Edit' via a dropdown menu that is presented to the user in the construction sheet. Changing the 'Action' column of a record to 'Edit' unlocks the record's fields that are to be constructed. The fields may change color to indicate they are unlocked so the user can edit them.

At 909, the record is checked out. For example, a flag is set in the staging table in the back end indicating that the record is checked out, and the user may edit the record. The construction worksheet may indicate the record is checked out by the user and the time of check out. There may be restrictions on the data that can be entered in a field, which may be enforced by a drop down menu that limits the data that can be entered or may be enforced during validation. At 910, edits are received and at 911 the edits are saved. The user may check in the record after it is edited as described above in the method 700. For example, the user can click a 'Save' button. For example, clicking the 'Save' button invokes the exporting and post-construction validation. Before a record is sent back to the database it is checked to verify that all required fields per the validation requirements, which may be after any data construction operation is performed.

At 912, to add a record, a selection of an 'Add' mode is received from the user via the construction worksheet. FIG. 11 shows an example of selecting 'Add' mode through a drop-down menu.

At 913, a new row is created. For example, the new row is created below the record that the user currently has selected or to the bottom of the table if no record is currently selected. More than one new row may be added at a time. The data for the new row or rows is received at 914 and saved at 915 when the user saves the new records and gets out of 'Add' mode. For example, when the user has constructed a new set of records that they would like to send back to the database 110 they can do so by clicking the 'Save' button. Before a record is sent back to the database it is checked to verify that all required fields per the validation requirements, which may be after any data construction operation is performed. For example, clicking the 'Save' button invokes the exporting and post-construction validation.

At 916, to delete a record, a selection of a 'Delete' mode is received from the user via the construction worksheet for a record if the record is not checked out. The deletion is saved at 917. For example, to finalize the deletion of the record the user must press the 'Save' button, which will commit all changes to the database 110 after post-construction validation. Each type of data construction operation may have privileges and the user can only perform the operation for which he or she has privileges.

Figure 12:
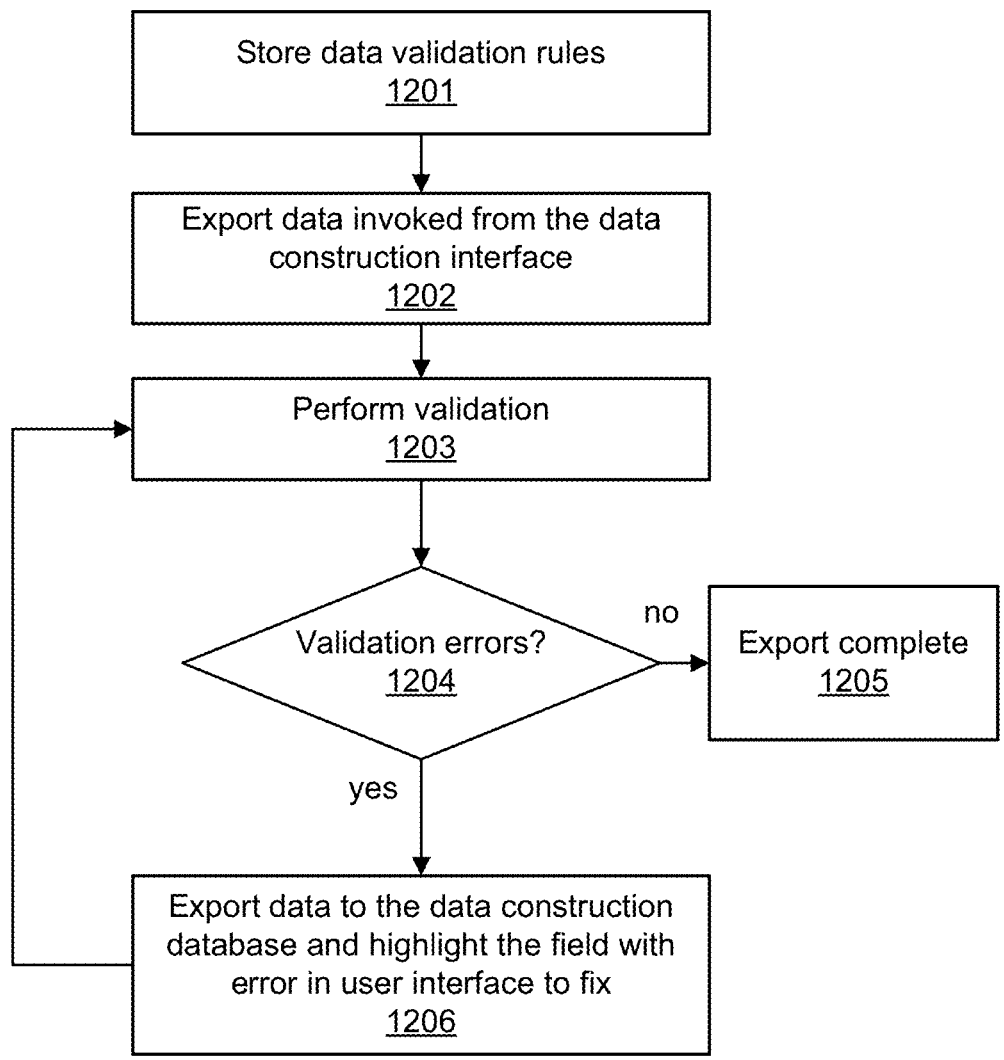
FIG. 12 shows a flow chart for a data validation process, according to an embodiment.

FIG. 12 shows a flowchart 1200 for data validation. The method 1200 may be performed when data is being exported from the user interface to the data construction database 110. For example, data is initially may be imported from the data construction database 110 to the construction worksheet and data construction operations may be performed on the data in the construction worksheet such as discussed in the method 900. The data validation may be performed before exporting the data from the construction worksheet to the data construction database 110.

At 1201, data validation rules are stored in the data construction system 100. For example, as described in the method 400 shown in FIG. 4, validation rules may be specified in the functional design standard for each object and stored in the data storage 140. Also, field-level construction requirements stored in the data storage 140 define construction requirements at the field level, including field type, relevancy rules, data type, data length, acceptable values, etc., which may be checked during validation. For example, validation rules may identify the type of data for a field, whether a field can have no data or null data values, length of data in a field, etc. The names of fields with errors are put into error columns which may be displayed to a user.

At 1202, exporting data from the data construction interface to the data construction database 110 is invoked. For example, after the user performs a data construction operation, such as described in the method 900, the user saves the data to invoke exporting the data to the data construction database 110.

Figure 13:
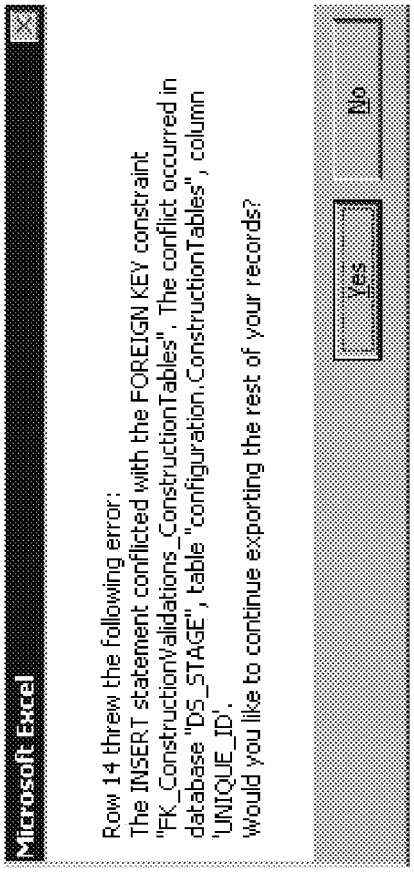
FIGS. 13-14 show examples of validation error messages, according to embodiments.
Figure 14:
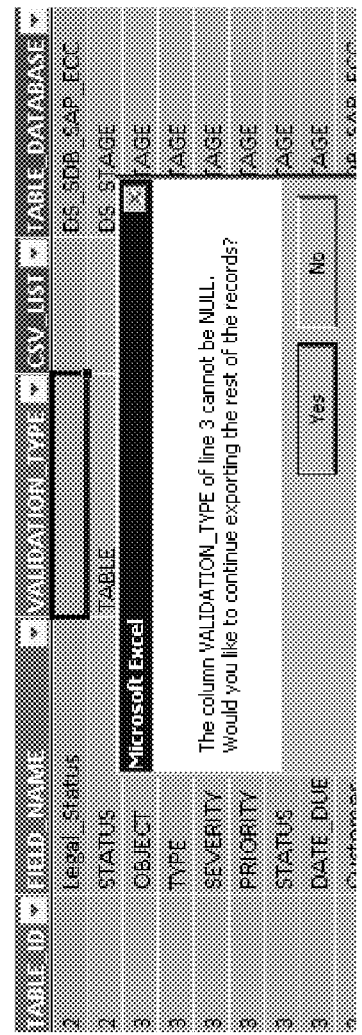

At 1203, validation is performed on the data in the construction worksheet prior to exporting. At 1204, a determination is made as to whether there is any validation errors found based on the validation rules. If a data validation error is found, an error message is displayed. FIGS. 13 and 14 show examples of error messages. For example, FIG. 13 shows an error message for a foreign key validation error that was detected and FIG. 14 shows an error message generated because a null value was entered in a field that requires a non-null value. At 1206, the data is exported to the data construction database 110, and the field with the error is highlighted so the user can fix the error. After the user fixes the error, validation may be performed again and the process may continue until all the validation errors are fixed and the export is completed at 1205.

The construction worksheet may highlight all validation errors to provide an indication of all the validation errors to the user via the user interface. Accordingly, the user may fix all the errors without waiting for an error message generated for each error. In one example, the construction worksheet may put an indication of errors in an error column. For example, the names of fields containing errors may be concatenated (e.g., space delimited) and inserted into an ERROR_COLUMN field. When the data is being exported, it checks to see if any field names are contained in the ERROR_COLUMN field; if so, they are highlighted and presented to the user and may be fixed.

Figure 15:
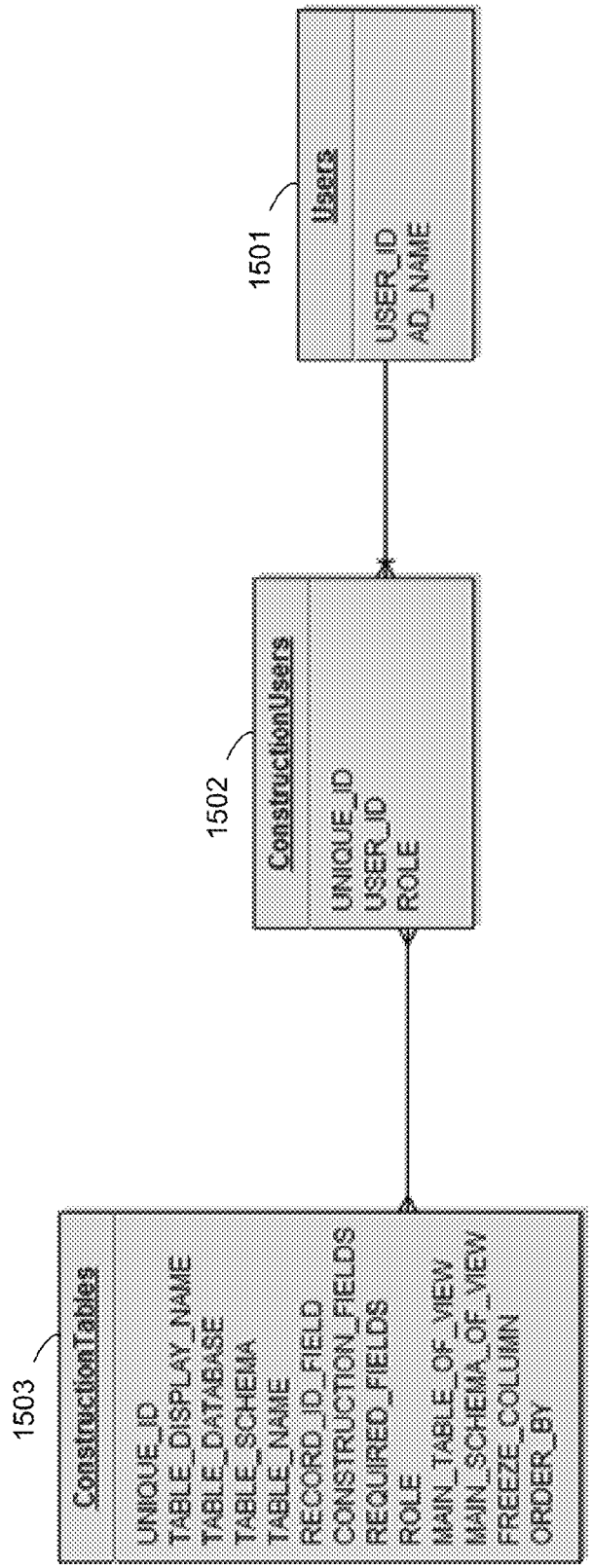
FIG. 15 shows examples of configuration tables, according to embodiments.

The data construction system 100 provides multi-level user access checks to determine whether the user has privileges to access the data in the data construction database 110, including the staging tables 111, and whether the user has access to objects in the data construction database 110. For example the system 100 first verifies that a user has access to the data construction database 110. In one example, WINDOWS authentication may be used for checking whether a user has access to the data construction database 110. For example, ODBC (Open Database Connectivity) may be used to check a list, which may be maintained by the database layer 120, to determine whether the user is authorized to access the data construction database 110. After connecting to the data construction database 110, the presentation interface 150 accesses configuration tables, which may be in the data construction database 110, to determine which data objects the user can access. This may be based on the role assigned to the user. FIG. 15 shows examples of hierarchal configuration tables 1501-1503. Through the tables 1501-1503, a user's role can be determined and the tables of the staging tables 111 approved for the role can be determined. For example, the USER_ID field links the Users and ConstructionUsers tables 1501 and 1502, and the ROLE links the ConstructionUsers and Construction tables 1502 and 1503.

FIG. 16 shows a flowchart of a method 1600 for multi-level user access checks which may be performed by way of example in the data construction system 100. At 1601, the user interface is executed. For example, the construction worksheet is launched by the user double-clicking on the construction worksheet. At 1602, the user ID is obtained. The user may be prompted to enter a user ID and password. At 1603, a determination is made as to whether the user can access the data construction database 110 based on the user ID. A user list may be maintained by the database layer 120 to determine whether the user is authorized to access the data construction database 110. If the user is not authorized, at 1604, access to data in the data construction database 110 is denied, and an indication may be displayed to indicate user access denied. At 1605, if the user is authorized to access the data construction database 110, data is imported from the staging tables 111 to the construction worksheet. At 1606, a determination is made as to which tables in the staging tables 111 the user is authorized to access. In one example, WINDOWS authentication may be used for determining which tables in the staging tables 111 the user is authorized to access, which may be different from the user ID and password used at 1602. The determination may be role-based, such as described with respect to FIG. 15. A data object may include all the fields in a table. So, if a user is authorized for a data object, the user is given the ability to view and/or edit data in the staging table for the data object through the data construction interface at 1607. Each table the user is authorized to access can be presented in a drop down menu, such as drop down menu for 'View' or 'Edit' described above with respect to FIGS. 9 and 10, or excluded from the drop down menu. The user can 'View' and/or 'Edit' data from the authorized tables but cannot do so for the non-authorized tables. At 1608, the user cannot view or edit data from the table if not authorized.

Figure 17:
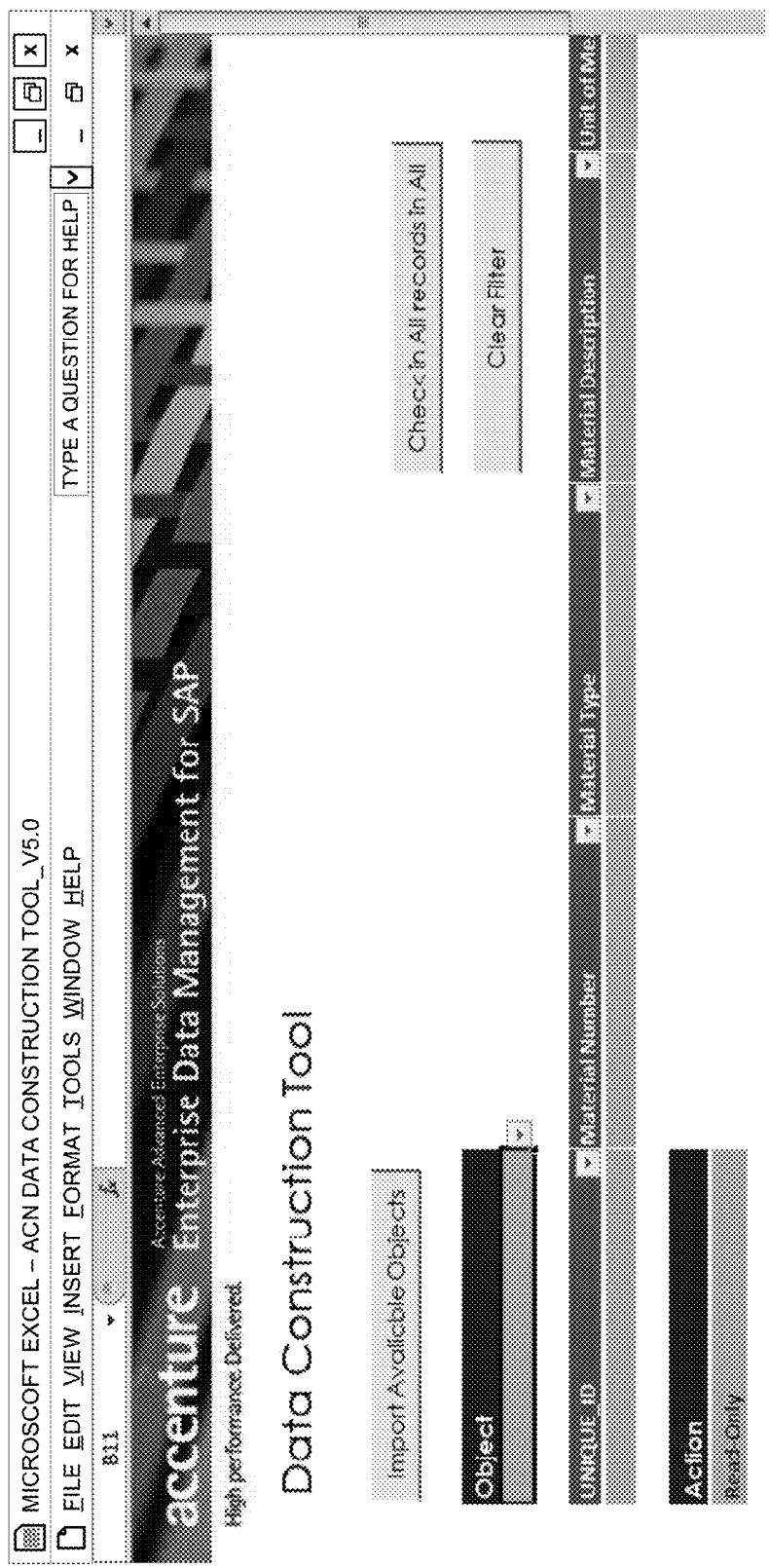

FIG. 17 shows an example of a screen shot generated in the presentation interface 150. For example, the presentation interface is launched and this screen is shown. The user can import the staging tables 111 by clicking on 'Import Construction Tables' and a drop down menu for 'Object' shows the tables the user can access. Actions can be selected from the screen, such as to import a table for 'View' or 'Edit'. Records can be checked in after being checked out by the user, and filter values can be cleared.

FIGS. 18-24 show other examples of screenshots generated in the presentation interface 150 comprised of the construction worksheet. These screen shots show examples of the construction worksheet highlighting fields in records where validation errors are detected. These validation errors may be detected prior to or in response to importing the data for the staging table into the construction worksheet. In FIG. 18, the 'UNIT_OF_MEASURE' field is highlighted for records where the field is missing values. FIG. 19 similarly shows other fields that are highlighted for records where the fields are missing values. Also shown at row 1 of FIG. 18 are clickable options, such as for 'Add a Row', 'Save', 'Check-In Records' and 'Options'.

FIG. 20 shows an example of an error column including values generated by concatenating field names of all the fields that have detected validation errors. Also, fields are shown for 'CHECKED_OUT', 'CHECKED_OUT_BY', and 'CHECKED_OUT_ON'. FIGS. 21-24 show examples of editing a record to fix validation errors. FIGS. 21 and 22 show changing the action for row 16 from 'View' to 'Edit' to allow editing. The user can only do this if the user has checked out the record or the entire table. FIG. 3 shows scrolling to the fields for 'GROSS_WEIGHT', 'WEIGHT_UNIT', and 'NET_WEIGHT' so data construction can be performed for those fields in the 'Edit' mode. FIG. 24 shows adding values for those fields in row 16. After the data construction operations are performed, the user can it the 'Save' button which is shown in FIG. 18. Then, post-data-construction validation is performed to determine if validation errors are detected. The post-data-construction validation for example may detect errors that were not fixed or were improperly fixed so the new data does not comply with the validation rules. The user may fix the validation errors and the data is exported to the staging tables 111. Then, the data may be loaded from the staging tables 111 in the data construction database into the target database 120.

While the embodiments have been described with reference to examples, those skilled in the art will be able to make various modifications to the described embodiments without departing from the scope of the claimed embodiments.

What is claimed is:

1. A data construction system to facilitate data construction operations for a database, the data construction system comprising:
   a database management system including a database server comprising a processor, the database server storing a data construction database including a staging table, and data configuration information including field mappings, validation rules, and user access information,
   wherein the database management system is connected to a data source and a target database via at least one network, and wherein the database management system is to:
      receive data from the data source,
      determine from the field mappings source fields for the data source that map to target fields in the staging table, and
      store the data from the data source in the staging table according to the field mappings; and
   a data construction interface including an interface to import data from the staging table and export data to the staging table,
   wherein the data construction interface is to:
      facilitate a pre-data-construction validation check and a post-data-construction validation check according to the validation rules stored in the database server,
      perform data construction operations on the imported data based on the pre-data-construction validation check and a check-in-check-out process that locks records for single-user actions, and
      export the data on which the data construction operations were performed to the staging table after performing the post-data-construction validation check, and
   wherein the database management system stores the exported data in the staging table, and the data from the staging table is loaded into the target database from the data construction database.

2. The data construction system of claim 1, wherein the data construction interface displays the imported data, determines whether an edit mode or a view mode has been entered, and if the edit mode is entered, allows a user to edit the imported data to perform a data construction operation, and if the view mode is entered, allows the user to view and not edit the imported data.

3. The data construction system of claim 1, wherein to execute the check-in-check-out process, the data construction interface sets a flag in the staging table to check-out records for the staging table, and wherein the records for the staging table are not simultaneously checked out by another user.

4. The data construction system of claim 1, wherein to allow a user to perform a data construction operation on the data in the staging table, the data construction interface determines whether the user is authorized to access the data construction database and determines whether the user is authorized to access the staging table if the user is determined to be authorized to access the data construction database.

5. The data construction system of claim 4, wherein the data construction interface connects to the database management system through open database connectivity to check a list of authorized users to determine if the user is authorized to access the data construction database.

6. The data construction system of claim 4, wherein the data construction interface determines a role of the user and queries configuration tables in the data construction database to determine if the role of the user is approved for the staging table to determine if the user is authorized to access the staging table.

7. The data construction system of claim 1, wherein the data construction interface displays the imported data and highlights fields in records of the imported data where validation errors are detected in response to the pre-data-construction validation.

8. The data construction system of claim 7, wherein the data construction interface facilitates the data construction operations on the highlighted fields in the records where the validation errors are detected, and executes the post-data-construction validation in response to invoking of the exporting of the data from the data construction interface to the staging table.

9. The data construction system of claim 8, wherein the data construction interface stops the export and displays a message to continue the export or to fix the data if the post-data-construction validation identifies data validation errors.

10. The data construction system of claim 8, wherein the pre-data-construction validation and the post-data-construction validation are executed by the database management system if the data construction is a simple data construction on only one staging table, and the pre-data-construction validation and the post-data-construction validation are executed by the database management system and the data construction interface if the data construction is a multi-level data construction on multiple staging tables that are relationally connected through a primary and foreign key.

11. The data construction system of claim 1, wherein the data configuration information does not include pre-populated keys determined from the data source and identifies whether a target field is a foreign key or a primary key if a full data construction is to be performed, and the data configuration information includes a pre-populated key determined from the data source if the data construction is a partial data construction.

12. The data construction system of claim 1, comprising a plurality of the data construction interfaces hosted on a plurality of different computer systems and are simultaneously connected to the database management system to import and export data for the staging table to view or edit the data.

13. A data construction system to facilitate data construction operations for a database, the data construction system comprising:
a database server comprising a processor and hosting a database management system including a data construction database having a staging table, and storing data configuration information including validation rules;
a construction interface hosted on a computer system and connected to the data construction database via a network, wherein the data construction interface imports data from the staging table, displays the imported data, and performs data construction operations on the imported data through a check-in-check-out process that locks records in the staging table for single-user operations,
wherein the data construction operations are based on a pre-data-construction validation check and a post-data-construction validation check based on the validation rules, and the data on which the data construction operations are performed is exported from the data construction interface to the staging table after performing the post-data-construction validation check,
and the database management system stores the data exported to the staging table, and the data from the staging table is loaded into a target database from the data construction database.

14. The data construction system of claim 13, wherein the data construction interface, to execute the check-in-check-out process, sets a flag in the staging table to check-out records for the staging table, and the records for the staging table cannot be simultaneously checked out by another user through another data construction interface.

15. The data construction system of claim 13, wherein the data construction interface determines whether the user is authorized to access the data construction database, and determines whether the user is authorized to access the staging table if the user is determined to be authorized to access the data construction database to display the imported data.

16. The data construction system of claim 15, wherein the data construction interface connects to the database management system to check a list of authorized users stored in the database management system to determine if a user of the data construction interface is authorized to access the data construction database.

17. The data construction system of claim 15, wherein the data construction interface connects to the database management system to determines a role of the user and queries configuration tables in the data construction database to determine if the role of the user is approved for the staging table to determine if the user is authorized to access the staging table.

18. The data construction system of claim 13, wherein the data construction interface displays the imported data and highlights fields in records of the imported data where validation errors are detected in response to the pre-data-construction validation.

19. The data construction system of claim 13, wherein the data construction interface facilitates the data construction operations on the highlighted fields in the records where the validation errors are detected, and executes the post-data-construction validation in response to invoking of the exporting of the data from the one data construction interface to the staging table.

20. A method for data construction to facilitate extract, transform, and load (ETL) operations between a data source and a target database, the method comprising:
storing a data construction database, wherein the data construction database includes a staging table having fields of the target database;
determining mappings from fields of the data source to the fields in the staging table;
storing data in the staging table from the data source according to the mappings;
determining whether a user is authorized to access the data construction database;
importing data from the staging table to a data construction interface in response to determining the user is authorized to access the data construction database;

determining whether the user is authorized to access the staging table according to a role of the user in an organization;

performing a pre-data-construction validation check on the imported data and displaying the imported data via the data construction interface in response to determining that the user is authorized to access the staging table, wherein the displayed data highlights validation errors determined from the pre-data-construction validation check;

performing, by the data construction interface, data construction operations on the displayed data according to the validation errors determined from the pre-data-construction validation check, wherein a check-in-check-out process locks records in the staging table for the data construction operations so only a single user can perform data construction operations at any given time on the data from the staging table via any of a plurality of data construction interfaces;

in response to invoking exporting of the data from the data construction interface to the staging table, performing a post-data-construction validation check on the data in the data construction interface, wherein the data construction interface facilitates performing data construction operations to fix validation errors determined from the post-data-construction validation check prior to exporting the data;

exporting the data to the staging table from the data construction interface; and loading the exported data from the staging table into the target database.

* * * * *